(12) United States Patent
Bala et al.

(10) Patent No.: US 9,986,541 B2
(45) Date of Patent: May 29, 2018

(54) UPLINK CONTROL INFORMATION TRANSMISSION METHODS FOR CARRIER AGGREGATION

(71) Applicant: INTERDIGITAL PATENT HOLDINGS, INC., Wilmington, DE (US)

(72) Inventors: Erdem Bala, East Meadow, NY (US); Philip J. Pietraski, Jericho, NY (US); Sung-Hyuk Shin, Northvale, NJ (US); Guodong Zhang, Syosset, NY (US); Allan Y. Tsai, Boonton, NJ (US); Joseph S. Levy, Merrick, NY (US); Pascal M. Adjakple, Great Neck, NY (US); John W. Haim, Baldwin, NY (US); Robert L. Olesen, Huntington, NY (US); Kyle Jung-Lin Pan, Saint James, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days. days.

(21) Appl. No.: 15/187,826

(22) Filed: Jun. 21, 2016

(65) Prior Publication Data
US 2016/0302189 A1    Oct. 13, 2016

Related U.S. Application Data

(63) Continuation of application No. 12/582,462, filed on Oct. 20, 2009, now Pat. No. 9,402,247.
(Continued)

(51) Int. Cl.
*H04W 4/00* (2018.01)
*H04W 72/04* (2009.01)
(Continued)

(52) U.S. Cl.
CPC ........ *H04W 72/0413* (2013.01); *H04B 7/024* (2013.01); *H04L 1/1812* (2013.01);
(Continued)

(58) Field of Classification Search
CPC ............... H04L 5/0053; H04L 1/1812; H04W 72/0446; H04B 7/0632
(Continued)

(56) References Cited

U.S. PATENT DOCUMENTS

| 8,000,291 B2 | 8/2011 | Pinheiro et al. |
| 8,311,053 B2 | 11/2012 | Choi |

(Continued)

FOREIGN PATENT DOCUMENTS

| CN | 101296513 A | 10/2008 |
| CN | 101409894 A | 4/2009 |

(Continued)

OTHER PUBLICATIONS

3GPP TSG-RAN-WG1 Meeting #54bis Prague, Czech Republic, Sep. 29-Oct. 3, 2008 R1-083706.*
(Continued)

*Primary Examiner* — Faisal Choudhury
(74) *Attorney, Agent, or Firm* — Condo Roccia Koptiw LLP

(57) ABSTRACT

A method and apparatus for transmitting uplink control information (UCI) for Long Term Evolution-Advanced (LTE-A) using carrier aggregation is disclosed. Methods for UCI transmission in the uplink control channel, uplink shared channel or uplink data channel are disclosed. The methods include transmitting channel quality indicators (CQI), precoding matrix indicators (PMI), rank indicators (RI), hybrid automatic repeat request (HARQ) acknowledgement/non-acknowledgement (ACK/NACK), channel status reports (CQI/PMI/RI), source routing (SR) and sound-
(Continued)

ing reference signals (SRS). In addition, methods for providing flexible configuration in signaling UCI, efficient resource utilization, and support for high volume UCI overhead in LTE-A are disclosed.

22 Claims, 7 Drawing Sheets

Related U.S. Application Data

(60) Provisional application No. 61/106,847, filed on Oct. 20, 2008, provisional application No. 61/115,351, filed on Nov. 17, 2008, provisional application No. 61/172,127, filed on Apr. 23, 2009, provisional application No. 61/218,782, filed on Jun. 19, 2009.

(51) Int. Cl.
  *H04L 5/00* (2006.01)
  *H04B 7/024* (2017.01)
  *H04L 1/18* (2006.01)
  *H04B 7/06* (2006.01)

(52) U.S. Cl.
  CPC ............ *H04L 5/001* (2013.01); *H04L 5/0053* (2013.01); *H04W 72/0446* (2013.01); *H04B 7/066* (2013.01); *H04B 7/0632* (2013.01); *H04B 7/0639* (2013.01); *H04W 72/042* (2013.01)

(58) Field of Classification Search
  USPC ......................................................... 370/329
  See application file for complete search history.

(56) References Cited

U.S. PATENT DOCUMENTS

| | | | |
|---|---|---|---|
| 8,345,618 B2 | 1/2013 | Kim et al. | |
| 9,402,247 B2 | 6/2016 | Bala et al. | |
| 2006/0280142 A1 | 12/2006 | Damnjanovic et al. | |
| 2008/0045260 A1 | 2/2008 | Muharemovic et al. | |
| 2008/0049668 A1 | 2/2008 | Kakura et al. | |
| 2008/0069035 A1 | 3/2008 | Pinheiro et al. | |
| 2008/0253318 A1 | 10/2008 | Malladi et al. | |
| 2008/0311919 A1 | 12/2008 | Whinnett et al. | |
| 2009/0103428 A1 | 4/2009 | Kim et al. | |
| 2009/0116570 A1 | 5/2009 | Bala et al. | |
| 2009/0147875 A1 | 6/2009 | Akita et al. | |
| 2009/0181712 A1 | 7/2009 | Xu | |
| 2009/0186613 A1 | 7/2009 | Ahn et al. | |
| 2009/0201825 A1 | 8/2009 | Shen et al. | |
| 2009/0207784 A1 | 8/2009 | Lee et al. | |
| 2009/0245331 A1* | 10/2009 | Palanki ................. | H04L 5/0053 375/148 |
| 2009/0303978 A1 | 12/2009 | Pajukoski et al. | |
| 2010/0091755 A1* | 4/2010 | Kwon .................... | H04L 5/0007 370/344 |
| 2010/0098012 A1* | 4/2010 | Bala ........................ | H04L 5/001 370/329 |
| 2010/0135231 A1 | 6/2010 | Harada et al. | |
| 2010/0135273 A1 | 6/2010 | Kim | |
| 2010/0136992 A1 | 6/2010 | Harada et al. | |
| 2010/0234061 A1 | 9/2010 | Khandekar et al. | |
| 2010/0271970 A1 | 10/2010 | Pan et al. | |
| 2010/0273494 A1 | 10/2010 | Iwai et al. | |
| 2010/0331003 A1 | 12/2010 | Park et al. | |
| 2011/0021230 A1 | 1/2011 | Moberg et al. | |
| 2011/0032926 A1 | 2/2011 | Shuqiang et al. | |
| 2011/0038271 A1 | 2/2011 | Shin et al. | |
| 2011/0038341 A1* | 2/2011 | Norlund ................ | H04L 1/1812 370/329 |
| 2011/0059767 A1* | 3/2011 | Parkvall ................ | H04L 1/1635 455/550.1 |
| 2011/0151913 A1 | 6/2011 | Forster et al. | |
| 2011/0216713 A1 | 9/2011 | Kim et al. | |
| 2011/0216729 A1 | 9/2011 | Miki et al. | |
| 2011/0255469 A1 | 10/2011 | Kishiyama et al. | |
| 2011/0274099 A1 | 11/2011 | Kwon et al. | |
| 2012/0113827 A1 | 5/2012 | Yamada et al. | |
| 2012/0163330 A1 | 6/2012 | Mitra et al. | |
| 2014/0177572 A1 | 6/2014 | Papasakellariou et al. | |

FOREIGN PATENT DOCUMENTS

| | | | |
|---|---|---|---|
| EP | | 1811683 A2 | 7/2007 |
| EP | | 1811685 A2 | 7/2007 |
| EP | | 2036238 A1 | 3/2009 |
| EP | | 2273831 A1 | 1/2011 |
| EP | | 2348658 A2 | 7/2011 |
| GB | | 2439367 A | 12/2007 |
| JP | | 2008-236426 A | 10/2008 |
| JP | | 2010-074754 A | 4/2010 |
| JP | | 2012-507241 A | 3/2012 |
| JP | | 2012-169693 A | 9/2012 |
| JP | | 2012-520645 A | 9/2012 |
| KR | | 10-2009-0024272 A | 3/2009 |
| WO | WO 2008/042187 A2 | | 4/2008 |
| WO | WO 2008/120925 A1 | | 10/2008 |
| WO | WO 2009-011523 A1 | | 1/2009 |
| WO | WO 2009/021244 A2 | | 2/2009 |
| WO | WO 2010/058979 A2 | | 5/2010 |
| WO | WO 2010/105667 A1 | | 9/2010 |

OTHER PUBLICATIONS

Panasonic, Support of UL/DL asymmetric carrier aggregation, 3GPP TSG RAN WG1 Meeting #54 R1-082999, Jeju, Korea, Aug. 18-22, 2008.*
3rd Generation Partnership Project (3GPP), R1-074675, "Uplink Reference Signal Sequence Assignments in E-UTRA", Texas Instruments, 3GPP TSG RAN WG1#51, Jeju, Korea, Nov. 5-9, 2007, 3 pages.
3rd Generation Partnership Project (3GPP), R1-082468, "Carrier Aggregation in LTE-Advanced", Ericsson, 3GPP TSG-RAN WG1, Meeting #53bis, Warsaw, Poland, Jun. 30-Jul. 4, 2008, 6 pages.
3rd Generation Partnership Project (3GPP), R1-082807, "CM Analysis of UL Transmission for LTE-A", InterDigital Communications, LLC, 3GPP TSG-RAN WG1, Meeting #54, Jeju, Korea, Aug. 18-22, 2008, 8 pages.
3rd Generation Partnership Project (3GPP), R1-082999, "Support of UL/DL Asymmetric Carrier Aggregation", Panasonic, 3GPP TSG RAN WG1 Meeting #54, Jeju, Korea, Aug. 18-22, 2008, 3 pages.
3rd Generation Partnership Project (3GPP), R1-083193, "Carrier Aggregation Operation in LTE-Advanced", Qualcomm Europe, 3GPP TSG RAN WG1 Meeting #54, Jeju, South Korea, Aug. 18-22, 2008, pp. 1-4.
3rd Generation Partnership Project (3GPP), R1-083528, "Issues on Carrier Aggregation for Advanced E-UTRA", Texas Instruments, 3GPP TSG RAN WG1 54bis, Prague, Czech Republic, Sep. 29-Oct. 3, 2008, 6 pages.
3rd Generation Partnership Project (3GPP), R1-083679, "UL Layered Control Signal Structure in LTE-Advanced", NTT DoCoMo Inc., 3GPP TSG RAN WG1, Meeting #54bis, Sep. 29-Oct. 3, 2008, 14 pages.
3rd Generation Partnership Project (3GPP), R1-083706, "DL/UL Asymmetric Carrier Aggregation", Huawei, 3GPP TSG-RAN WG1 #54b, San Francisco, USA, May 4-8, 2009, pp. 1-5.
3rd Generation Partnership Project (3GPP), R1-083730, "L1 Control Signaling With Carrier Aggregation in LTE-Advanced", Nokia, Nokia Siemens Networks, 3GPP TSG-RAN WG1 Meeting #54bis, Prague, Czech Republic, Sep. 29-Oct. 3, 2008, 6 pages.
3rd Generation Partnership Project (3GPP), R1-083733, "Algorithms and Results for Autonomous Component Carrier Selection for LTE-Advanced", Nokia Siemens Networks, 3GPP TSG RAN WG1 #54bis Meeting, Prague, Czech Republic, Sep. 29-Oct. 3, 2008, 5 pages.

(56) References Cited

OTHER PUBLICATIONS

3rd Generation Partnership Project (3GPP), R1-084190, "Draft CR for 36.213 of Clarification of Misconfiguration of Aperiodic CQI and SR", LGE, 3GPP TSG-RAN1 Meeting #55, Prague, Czech Republic, Nov. 10-14, 2008, 2 pages.
3rd Generation Partnership Project (3GPP), R1-084398, "Aspects to Consider for DL Transmission Schemes of LTE-A", Qualcomm Europe, 3GPP TSG-RAN WG1, Meeting #55, Prague, Czech Republic, Nov. 10-14, 2008, 11 pages.
3rd Generation Partnership Project (3GPP), R1-090234, "UL Control Signalling to Support Bandwidth Extension in LTE-Advanced", Nokia Siemens Networks, 3GPP TSG-RAN WG1, Meeting #55bis, Ljubljana, Slovenia, Jan. 12-16, 2009, 5 pages.
3rd Generation Partnership Project (3GPP), R1-090362, "Support of Concurrent Transmission of PUCCH and PUSCH in LTE-A Uplink", Qualcomm Europe, 3GPP TSGRAN WG1, Meeting #55bis, Ljubljana, Slovenia, Jan. 12-16, 2009, 3 pages.
3rd Generation Partnership Project (3GPP), R1-090363, "CM Analysis of Concurrent PUSCH and PUCCH UL Transmission for LTE-A", Qualcomm Europe, 3GPP TSG-RAN WG1, Meeting #55bis, Ljubljana, Slovenia, Jan. 12-16, 2009, 7 pages.
3rd Generation Partnership Project (3GPP), R1-090430, "Alignment of RAN1/RAN4 Specification on UE Maximum Output Power", LG Electronics, 3GPP TSG-RAN WG1, Meeting #55bis, Ljubljana, Slovenia, Jan. 12-16, 2009, 8 pages.
3rd Generation Partnership Project (3GPP), R1-090544, "Text Proposal for TR36.814 on Uplink Transmission Scheme", Ericsson, 3GPP TSG-RAN WG1, Meeting #55bis, Ljubljana, Slovenia, Jan. 12-16, 2009, 2 pages.
3rd Generation Partnership Project (3GPP), R1-090611, "Concurrent PUSCH and PUCCH Transmissions", Samsung, 3GPP TSG-RAN WG1, Meeting #56, Athens, Greece, Feb. 9-13, 2009, 2 pages.
3rd Generation Partnership Project (3GPP), R1-090654, "PUCCH Piggybacking Onto PUSCH in Case of Transmit Power Limitation", LG Electronics, 3GPP TSG-RAN WG1, Meeting #56, Athens, Greece, Feb. 9-13, 2009, 4 pages.
3rd Generation Partnership Project (3GPP), R1-090655, "Uplink Multiple Channel Transmission in Case of UE Transmit Power Limitation", LG Electronics, 3GPP TSG-RAN WG1, Meeting #56, Athens, Greece, Feb. 9-13, 2009, 3 pages.
3rd Generation Partnership Project (3GPP), R1-090738, "PUSCH Power Control for LTE-Advanced", Nokia Siemens Networks, Nokia, 3GPP TSG-RAN WG1, Meeting #56, Athens, Greece, Feb. 9-13, 2009, 3 pages.
3rd Generation Partnership Project (3GPP), R1-091810, "PUCCH Design for Carrier Aggregation", Huawei, 3GPP TSG RAN WG1 #57, San Francisco, USA, May 4-8, 2009, 8 pages.
3rd Generation Partnership Project (3GPP), R1-091876, "CSI Signaling in L TE-A", Samsung, 3GPP TSG RAN WG1 #57, San Francisco, USA, May 4-8, 2009, pp. 1-3.
3rd Generation Partnership Project (3GPP), R1-091878, "Concurrent PUSCH and PUCCH Transmissions", Samsung, 3GPP TSG RAN WG1 #57, San Francisco, USA, May 4-8, 2009, pp. 1-2.
3rd Generation Partnership Project (3GPP), R1-091880, "UL Transmission Power Control in LTE-A", Samsung, 3GPP TSG RAN WG1 #57, San Francisco, USA, May 4-8, 2009, pp. 1-5.
3rd Generation Partnership Project (3GPP), R1-092415, "Uplink Power Control for Carrier Aggregation", Research in Motion, UK Limited, 3GPP TSG-RAN WG1, Meeting #57b, Los Angeles, CA, Jun. 29-Jul. 3, 2009, 3 pages.
3rd Generation Partnership Project (3GPP), R1-092574, "PUSCH Power Control for LTE-Advanced", Nokia Siemens Networks, Nokia, 3GPP TSG-RAN WG1, Meeting #57, Los Angeles, CA, Jun. 29-Jul. 3, 2009, 4 pages.
3rd Generation Partnership Project (3GPP), R1-092670, "UL Transmission Power Control in LTE-A", Samsung, 3GPP TSG-RAN WG1, Meeting #57bis, Los Angeles, CA, Jun. 29-Jul. 3, 2009, 5 pages.
3rd Generation Partnership Project (3GPP), R1-092983, "LS on Power Amplifier Configurations for UEs With Multiple Transmit Antennas in LTE-A", Qualcomm Europe, 3GPP TSG-RAN WG1, Meeting #57, Los Angeles, CA, Jun. 29-Jul. 3, 2009, 5 pages.
3rd Generation Partnership Project (3GPP), TR 36.814 V1.5.0, "Technical Specification Group Radio Access Network, Further Advancements for E-UTRA Physical Layer Aspects (Release 9)", Nov. 2009, pp. 1-53.
3rd Generation Partnership Project (3GPP), TS 25.101 V6.8.0, "Technical Specification Group Radio Access Network, User Equipment (UE) Radio Transmission and Reception (FDD) (Release 6)", Jun. 2005, pp. 1-118.
3rd Generation Partnership Project (3GPP), TS 25.101 V8.4.0, "Technical Specification Group Radio Access Network, User Equipment (UE) Radio Transmission and Reception (FDD) (Release 8)", Sep. 2008, pp. 1-189.
3rd Generation Partnership Project (3GPP), TS 25.101 V8.5.1, "Technical Specification Group Radio Access Network, User Equipment (UE) Radio Transmission and Reception (FDD) (Release 8)", Jan. 2009, pp. 1-214.
3rd Generation Partnership Project (3GPP), TS 25.101 V8.8.0, "Technical Specification Group Radio Access Network, User Equipment (UE) Radio Transmission and Reception (FDD) (Release 8)", Sep. 2009, pp. 1-217.
3rd Generation Partnership Project (3GPP), TS 25.101 V8.9.0, "Technical Specification Group Radio Access Network, User Equipment (UE) Radio Transmission and Reception (FDD) (Release 8)", Dec. 2009, pp. 1-217.
3rd Generation Partnership Project (3GPP), TS 25.101 V9.2.0, "Technical Specification Group Radio Access Network, User Equipment (UE) Radio Transmission and Reception (FDD) (Release 9)", Dec. 2009, pp. 1-245.
3rd Generation Partnership Project (3GPP), TS 36.211 V10.0.0, "Technical Specification Group Radio Access Network, Evolved Universal Terrestrial Radio Access (E-UTRA), Physical Channels and Modulation (Release 10)", Dec. 2010, pp. 1-102.
3rd Generation Partnership Project (3GPP), TS 36.211 V8.4.0, "Technical Specification Group Radio Access Network, Evolved Universal Terrestrial Radio Access (E-UTRA), Physical Channels and Modulation (Release 8)", Sep. 2008, pp. 1-78.
3rd Generation Partnership Project (3GPP), TS 36.211 V8.8.0, "Technical Specification Group Radio Access Network, Evolved Universal Terrestrial Radio Access (E-UTRA), Physical Channels and Modulation (Release 8)", Sep. 2009, pp. 1-83.
3rd Generation Partnership Project (3GPP), TS 36.212 V10.0.0, "Technical Specification Group Radio Access Network, Evolved Universal Terrestrial Radio Access (E-UTRA), Multiplexing and Channel Coding (Release 10)", Dec. 2010, pp. 1-72.
3rd Generation Partnership Project (3GPP), TS 36.212 V8.4.0, "Technical Specification Group Radio Access Network, Evolved Universal Terrestrial Radio Access (E-UTRA), Multiplexing and Channel Coding (Release 8)", Sep. 2008, pp. 1-56.
3rd Generation Partnership Project (3GPP), TS 36.212 V8.7.0, "Technical Specification Group Radio Access Network, Evolved Universal Terrestrial Radio Access (E-UTRA), Multiplexing and Channel Coding (Release 8)", May 2009, pp. 1-60.
3rd Generation Partnership Project (3GPP), TS 36.213 V8.4.0, "Technical Specification Group Radio Access Network, Evolved Universal Terrestrial Radio Access (E-UTRA), Physical Layer Procedures (Release 8)", Sep. 2008, pp. 1-60.
3rd Generation Partnership Project (3GPP), TS 36.213 V8.5.0, "Technical Specification Group Radio Access Network, Evolved Universal Terrestrial Radio Access (E-UTRA), Physical Layer Procedures (Release 8)", Dec. 2008, pp. 1-74.
3rd Generation Partnership Project (3GPP), TS 36.213 V8.8.0, "Technical Specification Group Radio Access Network, Evolved Universal Terrestrial Radio Access (E-UTRA), Physical Layer Procedures (Release 8)", Sep. 2009, pp. 1-77.
3rd Generation Partnership Project (3GPP), TS 36.213 V9.0.1, "Technical Specification Group Radio Access Network, Evolved Universal Terrestrial Radio Access (E-UTRA), Physical Layer Procedures (Release 9)", Dec. 2009, pp. 1-79.
3rd Generation Partnership Project (3GPP), TS 36.321 V8.1.0, "Technical Specification Group Radio Access Network, Evolved

(56) References Cited

OTHER PUBLICATIONS

Universal Terrestrial Radio Access (E-UTRA), Medium Access Control (MAC) Protocol Specification (Release 8)", Mar. 2008, pp. 1-30.

3rd Generation Partnership Project (3GPP), TS 36.321 V8.4.0, "Technical Specification Group Radio Access Network, Evolved Universal Terrestrial Radio Access (E-UTRA), Medium Access Control (MAC) Protocol Specification (Release 8)", Dec. 2008, pp. 1-43.

3rd Generation Partnership Project (3GPP), TS 36.321 V8.8.0, "Technical Specification Group Radio Access Network, Evolved Universal Terrestrial Radio Access (E-UTRA), Medium Access Control (MAC) Protocol Specification (Release 8)", Dec. 2009, pp. 1-47.

3rd Generation Partnership Project (3GPP), TS 36.331 V8.3.0, "Technical Specification Group Radio Access Network, Evolved Universal Terrestrial Radio Access (E-UTRA) Radio Resource Control (RRC), Protocol Specification (Release 8)", Sep. 2008, pp. 1-178.

3rd Generation Partnership Project (3GPP), TS 36.331 V8.4.0, "Technical Specification Group Radio Access Network, Evolved Universal Terrestrial Radio Access (E-UTRA), Radio Resource Control (RRC), Protocol Specification (Release 8)", Dec. 2008, pp. 1-198.

3rd Generation Partnership Project (3GPP), TS 36.331 V8.7.0, "Technical Specification Group Radio Access Network, Evolved Universal Terrestrial Radio Access (E-UTRA) Radio Resource Control (RRC), Protocol Specification (Release 8)", Sep. 2009, pp. 1-208.

3rd Generation Partnership Project (3GPP), TS 36.331 V9.1.0, "Technical Specification Group Radio Access Network, Evolved Universal Terrestrial Radio Access (E-UTRA), Radio Resource Control (RRC), Protocol Specification (Release 9)", Dec. 2009, pp. 1-233.

Lim et al., "Channel-Dependent Scheduling of Uplink Single Carrier FDMA Systems", Wireless Communications and Networking Conference, WCNC, IEEE, Mar. 31, 2008, 5 pages.

\* cited by examiner

UPLINK CONTROL INFORMATION TRANSMISSION METHODS FOR CARRIER AGGREGATION

CROSS REFERENCE TO RELATED APPLICATIONS

This application is a continuation application of U.S. non-provisional application Ser. No. 12/582,462 filed Oct. 20, 2009, which claims the benefit of U.S. provisional application Nos. 61/106,847 filed Oct. 20, 2008; 61/115,351 filed Nov. 17, 2008; 61/172,127 filed Apr. 23, 2009; and 61/218,782 filed Jun. 19, 2009, all of which are incorporated by reference as if fully set forth.

FIELD OF INVENTION

This application is related to wireless communications.

BACKGROUND

Long Term Evolution (LTE) supports data rates up to 100 Mbps in the downlink and 50 Mbps in the uplink. LTE-Advanced (LTE-A) provides a fivefold improvement in downlink data rates relative to LTE using, among other techniques, carrier aggregation. Carrier aggregation may support, for example, flexible bandwidth assignments up to 100 MHz. Carriers are known as component carriers in LTE-A.

LTE-A may operate in symmetric and asymmetric configurations with respect to component carrier size and the number of component carriers. This is supported through the use or aggregation of up to five 20 MHz component carriers. For example, a single contiguous downlink (DL) 40 MHz LTE-A aggregation of multiple component carriers may be paired with a single 15 MHz uplink (UL) carrier. Non-contiguous LTE-A DL aggregate carrier assignments may therefore not correspond with the UL aggregate carrier assignment.

Aggregate carrier bandwidth may be contiguous where multiple adjacent component carriers may occupy continuous 10, 40 or 60 MHz. Aggregate carrier bandwidth may also be non-contiguous where one aggregate carrier may be built from more than one, but not necessarily adjacent component carriers. For example, a first DL component carrier of 15 MHz may be aggregated with a second non-adjacent DL component carrier of 10 MHz, yielding an overall 25 MHz aggregate bandwidth for LTE-A. Moreover, component carriers may be situated at varying pairing distances. For example, the 15 and 10 MHz component carriers may be separated by 30 MHz, or in another setting, by only 20 MHz. As such, the number, size and continuity of component carriers may be different in the UL and DL.

As more than one component carrier may be used to support larger transmission bandwidths in LTE-A, a wireless transmit/receive unit (WTRU) may be required to feedback uplink control information (UCI) such as for example, channel quality indicators (CQI), precoding matrix indicators (PMI), rank indicators (RI), hybrid automatic repeat request (HARQ), acknowledgement/non-acknowledgement (ACK/NACK), channel status reports (CQI/PMI/RI), and source routing (SR) associated with downlink transmission for several component carriers. This means that the number of bits for UCI is increased compared to LTE. In addition, for uplink transmissions, the Peak to Average Power Ratio (PAPR) or Cubic Metric (CM) property needs to be considered. A large PAPR would cause the WTRU to back-off the power which would result in performance degradation. Accordingly, physical uplink control channel (PUCCH) transmissions need to have a low PAPR or CM.

In LTE-A, it is anticipated that the UCI overhead may be increased, compared to LTE, taking into account the new features including coordinated multipoint transmission (CoMP), higher order DL multiple-input multiple-output (MIMO), bandwidth extension, and relay. For example, in order to support high order MIMO (8×8 MIMO) and/or CoMP, a large amount of channel status reports (CQI/PMI/RI) are fed back to the serving base station and possibly neighboring base stations as well in CoMP. The UCI overhead will be further increased in asymmetric bandwidth extension. Accordingly, the payload size of Release 8 LTE PUCCH may not be sufficient to carry the increased UCI overhead even for a single DL component carrier in LTE-A. Therefore new methods are needed to carry UCI in a LTE-A carrier aggregation system.

SUMMARY

A method and apparatus for transmitting uplink control information (UCI) for Long Term Evolution-Advanced (LTE-A) using carrier aggregation is disclosed. Methods for UCI transmission in the uplink control channel, uplink shared channel or uplink data channel are disclosed. The methods include transmitting channel quality indicators (CQI), precoding matrix indicators (PMI), rank indicators (RI), hybrid automatic repeat request (HARQ) acknowledgement/non-acknowledgement (ACK/NACK), channel status reports (CQI/PMI/RI), source routing (SR) and sounding reference signals (SRS). In addition, methods for providing flexible configuration in signaling UCI, efficient resource utilization, and support for high volume UCI overhead in LTE-A is disclosed.

Methods are also disclosed for using, configuring and multiplexing of a periodic uplink data channel to handle high volume variable size wireless transmit/receive unit (WTRU) feedback due to bandwidth extension in cases of multi-carriers, higher order multiple-input multiple-output (MIMO), coordinated multi-point transmission and reception (CoMP), frequency selectivity, and other scenarios where WTRU feedback information is large and may not use conventional periodic uplink control channels. The periodic uplink data channels carry high volume variable size WTRU feedback information, such as precoding matrix indicator (PMI), rank indication (RI), channel quality indicator (CQI), Acknowledge/Not Acknowledge (ACK/NACK), channel state information (CSI) etc. Configuration of periodic uplink data channel, reporting mode, reporting format, is also provided. Procedures to handle collisions between hybrid automatic repeat request (HARQ)-ACK and SR with multiplex periodic uplink data channel (control) and other uplink data channel (data) in the same subframe are disclosed.

BRIEF DESCRIPTION OF THE DRAWINGS

A more detailed understanding may be had from the following description, given by way of example in conjunction with the accompanying drawings wherein.

DETAILED DESCRIPTION

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment.

Figure 1:
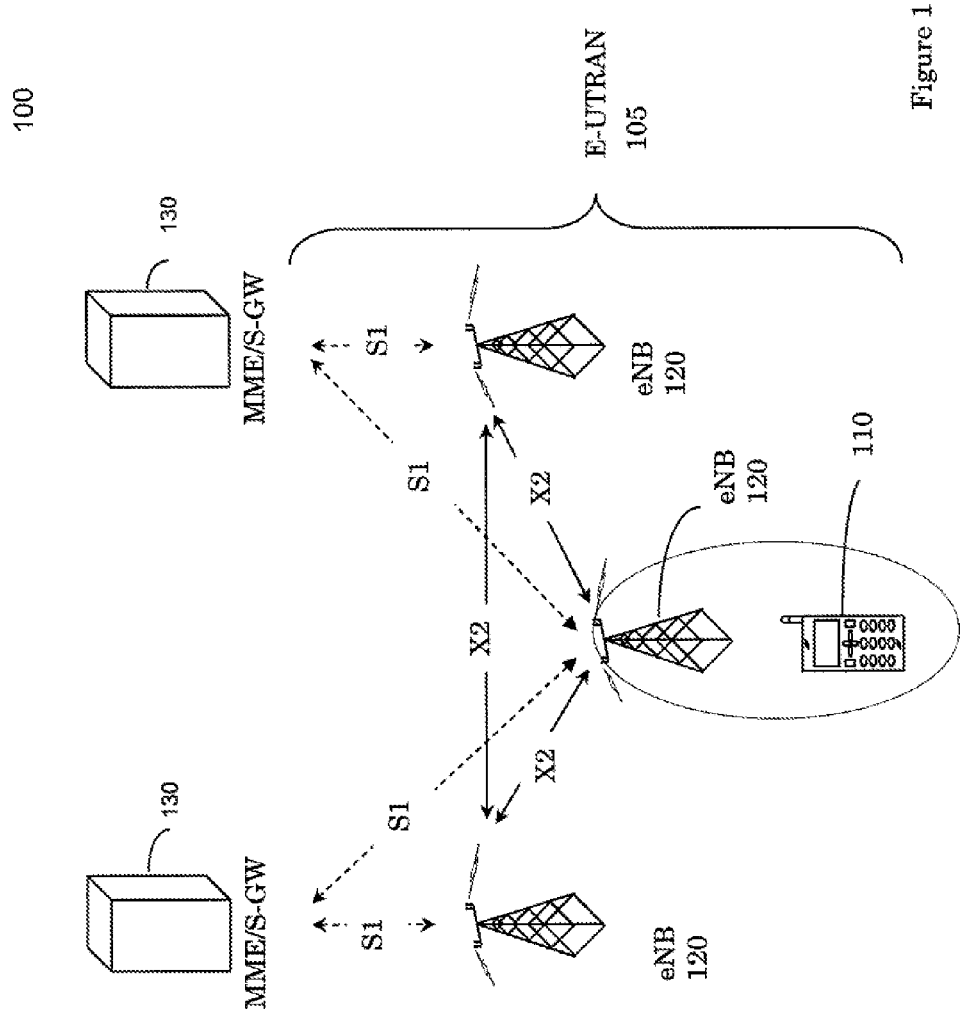
FIG. 1 is an embodiment of a wireless communication system/access network of long term evolution (LTE)

FIG. 1 shows a Long Term Evolution (LTE) wireless communication system/access network 100 that includes an Evolved-Universal Terrestrial Radio Access Network (E-UTRAN) 106. The E-UTRAN 105 includes a WTRU 110 and several base stations, such as evolved Node-Bs, (eNBs) 120. The WTRU 110 is in communication with an eNB 120. The eNBs 120 interface with each other using an X2 interface. Each of the eNBs 120 interface with a Mobility Management Entity (MME)/Serving GateWay (S-GW) 130 through an S1 interface. Although a single WTRU 110 and three eNBs 120 are shown in FIG. 1, it should be apparent that any combination of wireless and wired devices may be included in the wireless communication system access network 100.

Figure 2:
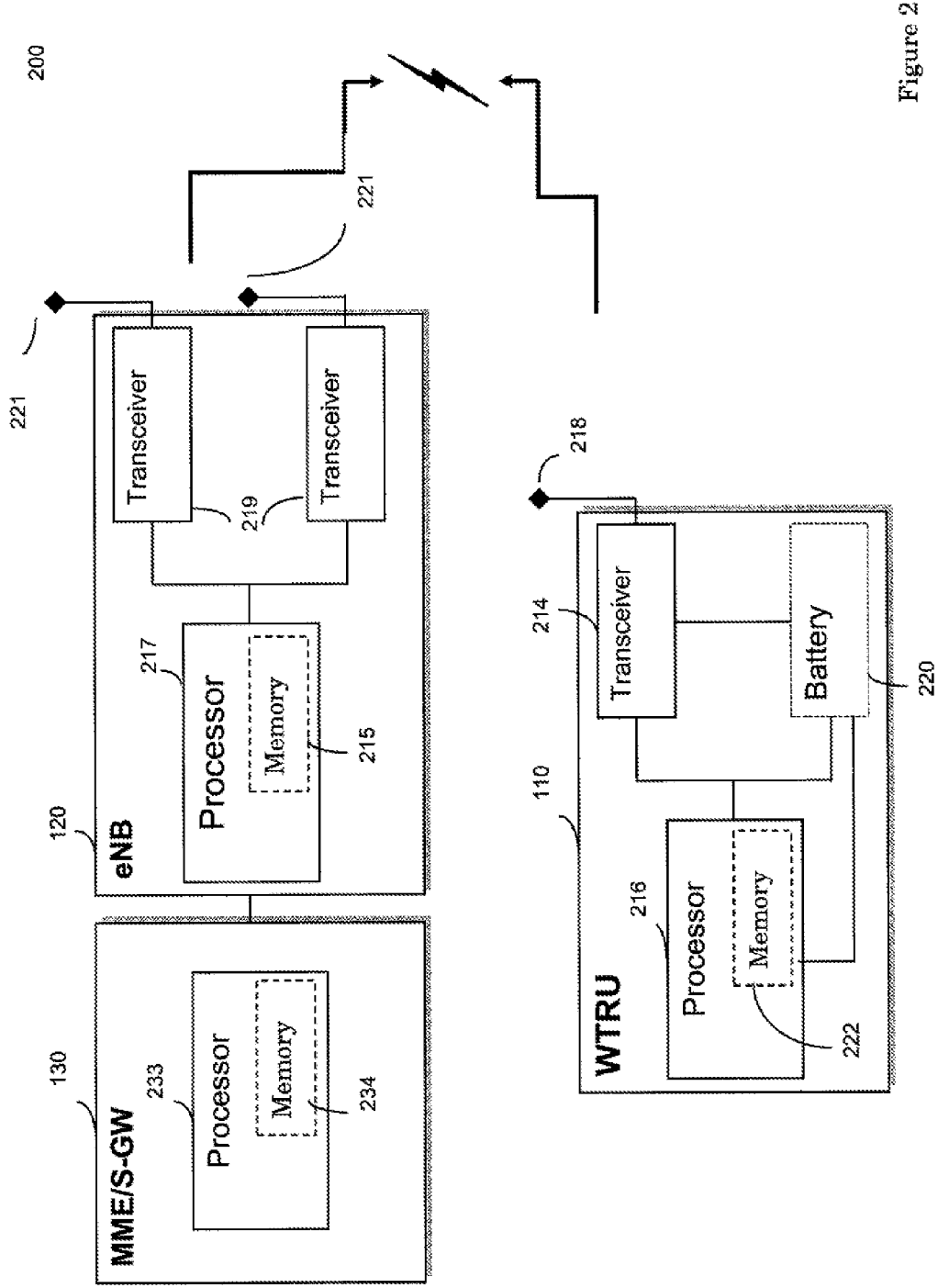
FIG. 2 are example block diagrams of a wireless transmit/receive unit (WTRU) and a base station of an LTE wireless communication system.

FIG. 2 is an exemplary block diagram of an LTE wireless communication system 200 including the WTRU 110, the eNB 120, and the MME/S-GW 130. As shown in FIG. 2, the WTRU 110, the eNB 120 and the MME/S-GW 130 are configured to perform uplink control information transmission methods for carrier aggregation.

In addition to the components that may be found in a typical WTRU, the WTRU 110 includes a processor 216 with an optional linked memory 222, at least one transceiver 214, an optional battery 220, and an antenna 218. The processor 216 is configured to perform uplink control information transmission methods for carrier aggregation. The transceiver 214 is in communication with the processor 216 and the antenna 218 to facilitate the transmission and reception of wireless communications. In case the optional battery 220 is used in the WTRU 110, it powers the transceiver 214 and the processor 216.

In addition to the components that may be found in a typical eNB, the eNB 120 includes a processor 217 with an optional linked memory 2165, transceivers 219, and antennas 221. The processor 217 is configured to perform uplink control information transmission methods for carrier aggregation. The transceivers 219 are in communication with the processor 217 and antennas 221 to facilitate the transmission and reception of wireless communications. The eNB 120 is connected to the Mobility Management Entity/Serving GateWay (MME/S-GW) 130 which includes a processor 233 with an optional linked memory 234.

Methods for transmitting uplink control information (UCI) for Long Term Evolution-Advanced (LTE-A) using carrier aggregation are disclosed. An example method using an uplink control channel such as a physical uplink control channel (PUCCH) is disclosed. UCI may include channel quality indicators (CQI), precoding matrix indicators (PMI), rank indicators (RI), hybrid automatic repeat request (HARQ), acknowledgement (ACK/NACK), channel status reports (CQI/PMI/RI), source routing (SR) and sounding reference signals (SRS).

Methods are also disclosed for providing flexible configuration in signaling UCI, efficient resource utilization, and support for high volume UCI overhead in LTE-A with respect to the PUCCH.

In an embodiment for mapping of CQI, PMI and RI to physical resource elements in carrier aggregation, the PUCCH that carries the CQI (and any other possible control information such as scheduling request, ACK/NACK, etc.) is transmitted on one uplink component carrier. This WTRU-specific uplink component carrier which carries the PUCCH may be configured by the eNodeB and signaled to the WTRU with higher layer signaling, for example RRC signaling. Alternatively, this uplink component carrier may be signaled by the eNodeB with L1 signaling. Alternatively, this uplink component carrier may be predetermined by an implicit mapping rule. Alternatively, this uplink component carrier may be selected by the WTRU.

In an example method for transmission over one uplink component carrier, the mapping of control data or control information to physical resource elements in carrier aggregation may comprise joint coding of the control data for downlink (DL) component carriers. For example, the CQI corresponding to several downlink component carriers may be jointly coded. The terms control data and control information are used interchangeably throughout.

The control data bits may be modulated and then each modulated symbol may be spread with a sequence, for example, a constant amplitude zero autocorrelation (CA-ZAC) sequence like a Zadoff-Chu sequence. The length of the spreading sequence, denoted by N, may be equal to the length of the subcarriers allocated for PUCCH transmission. In LTE, N=12 corresponds to the number of subcarriers in one resource block. PUCCHs of different WTRUs may use the spreading sequence with different cyclic shifts to maintain the orthogonality between them. The spread symbols may be mapped to the allocated subcarriers in an inverse fast Fourier transform (IFFT) block and transmitted after the IFFT is performed. For LTE-A, N may be larger than twelve. With a larger N, (i.e., a spreading sequence with longer length), a WTRU may use several different cyclic shifts of the spreading sequence to transmit more than one modulated data symbol per Single Carrier Frequency Division Multiple Access (SC-FDMA) or Orthogonal frequency-division multiplexing (OFDM) symbol.

The number of downlink carriers for each WTRU may be different, resulting in N being different. The code orthogonality may not be maintained if the same set of resource blocks (RBs) are used for all WTRUs each having different N. In this case, different sets of RBs may be allocated for different sequence lengths. As an example, if there are sequence lengths of 12 k where k=1, 2, . . . 5, then five sets of RBs may be required. In this case, the Peak to Average Power Ratio (PAPR) is also not increased. If a WTRU uses orthogonal sequences over the same RBs to transmit different modulation symbols, the PAPR may be increased after the IFFT.

In another method, the length of the spreading sequence may be the same for all WTRUs, for example N=12, as in LTE Release 8. Then, a WTRU may be configured to use more RBs to transmit more modulated symbols. For example, five RBs may be used to transmit five modulated symbols per SC-FDMA or OFDM symbol. The same or different spreading sequences may be used on these RBs.

Figure 3:
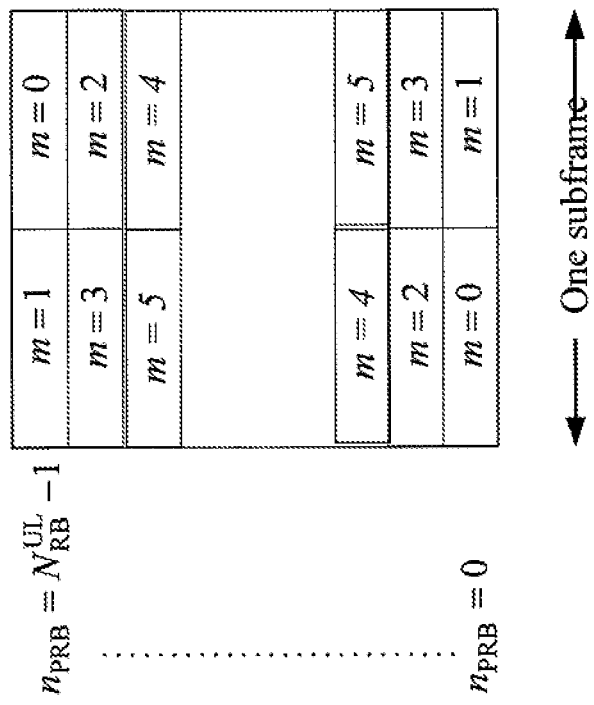
FIG. 3 shows example resource block allocations.

For example, in FIG. 3, each RB may carry one modulated symbol with a spreading sequence of twelve. Up to three RBs may be used in an SC-OFDM symbol to transmit three modulated symbols. In this case, because more than one sequence is used, the PAPR after the IFFT may be increased. In FIG. 3, each WTRU in LTE Release 8 uses one RB that is indexed with m. For example, m=1. N is the total number of RBs in an SC-FDMA symbol. In LTE-A, the WTRU may use more than one RB. For example, RBs indexed with m=0, 1, and 2. In this case, the WTRU uses 3 RBs. In LTE Release 8, a WTRU can use only a single RB.

To send more information in PUCCH as compared to LTE Release 8, the WTRU may be assigned more RBs with the same spreading sequence and cyclic shift. In this case, the WTRU may spread different data symbols with the same cyclic shift of the root sequence and map the spread symbols on different sets of RBs. Alternatively, the WTRU may be assigned the same set of RBs with more cyclic shifts of the same root sequence. In this case, the WTRU may spread different data symbols with different cyclic shifts of the same root sequence and map the spread symbol on the same set of RBs. In another alternative, the WTRU may be assigned more RBs with possibly different spreading sequences and cyclic shifts. In this case, the WTRU may spread different data symbols with possibly different cyclic shifts of different root sequences and map the spread symbol on different sets of RBs. In yet another alternative, the WTRU may be assigned a combination of the above. The assignment may be performed with L1 or L2/L3 signaling or pre-determined by an implicit mapping rule.

To control the PAPR increase, an adaptive PUCCH transmission method may be used where power-limited WTRUs may be required to transmit fewer modulated control data symbols in an SC-OFDM symbol. These WTRUs, for example may be assigned only a single downlink carrier. Alternatively, these WTRUs may be required to report wideband CQI/PMI/RI which requires a smaller number of bits or these WTRUs may be configured to use more subframes to transmit the whole control information. For example, in one subframe, the WTRU may transmit the control information corresponding to only one downlink component carrier and complete transmitting the control information corresponding to all component carriers in several subframes. For example, in subframe 1, the WTRU may transmit control information for downlink component carrier #1, and then in subframe 2, the WTRU may transmit the control information for downlink component carrier #2, etc. The WTRU configuration may be performed with L1 or L2/L3 signaling.

The carrier (or spectrum) edge resource blocks (RBs) may be used for control data transmission when an LTE-A network is configured to use LTE uplink control channel structure, as shown in FIG. 3. As shown in FIG. 3 for LTE Release 8, the WTRU uses two different RBs in the two time slots. For example, the RB indexed with m=1 is used by one WTRU, and m=1 is on opposite edges of the frequency in the two time slots. RBs on opposite edges of the spectrum may be used in two time slots for maximum frequency diversity. In this case, LTE-A and LTE Release 8 WTRUs may be configured to share the same PUCCH resources within the uplink (UL) carrier.

Alternatively, a predetermined portion of resources may be reserved and allocated for LTE-A PUCCH only. In this case, PUCCH's of LTE WTRUs and LTE-A WTRUs may use different RBs.

When there are multiple UL carriers (including one LTE carrier) available for the LTE-A WTRU, PUCCH transmission may be performed in one of the LTE-A carriers (excluding the LTE carrier), in order to avoid the control data to RE mapping collision with LTE, where RE is a resource element. In this case, the assignment of a LTE-A carrier may be performed on channel conditions, e.g. using the best component carrier over all the carriers.

In another example method for transmission over one uplink component carrier, the WTRU and the base station may be configured for separate coding of control for downlink (DL) carriers. In this example, the control data bits for different downlink carriers may be coded separately and then modulated. The methods disclosed herein above may be used for mapping to physical resource elements.

The control information for each downlink carrier may be transmitted by using different RBs, different spreading sequences/cyclic shifts or a combination of these. As an example, RBs m=1 and m=3 may be used for control data transmission corresponding to two different downlink carriers. In this case, the mapping of the control data resources (frequency, sequence, cyclic shift) to the downlink carrier may be performed with L1 and/or L2/L3 signaling. This mapping may also be performed implicitly by using mapping rules. For example, the CQI for the second downlink carrier may be transmitted with the same spreading sequence/cyclic shift pair as for the first downlink carrier but on the next available RB.

In another embodiment for mapping of CQI, PMI and RI to physical resource elements in carrier aggregation, the PUCCH that carries the CQI (and any other possible control information such as scheduling request, ACK/NACK, etc.) is transmitted on more than one uplink component carrier. In an example method for transmission on more than one uplink carrier, there is one PUCCH per UL component carrier carrying control information corresponding to one DL component carrier. The same PUCCH structure as in LTE may be used in each uplink carrier. Uplink carriers and downlink carriers may be linked to each other. Alternatively, if a component carrier is also used for LTE WTRUs, then no resource allocation is made for LTE-A PUCCH, in order to avoid resource collision between LTE-A PUCCH and LTE PUCCH. Alternatively, a certain portion of resources may be reserved and allocated for LTE-A PUCCH only. In this case, PUCCH's of LTE WTRUs and LTE-A WTRUs will use different RBs. This may allow the network to maintain backward compatibility with LTE.

In another example method for transmission on more than one uplink carrier, one PUCCH per UL component carrier may carry control data corresponding to several DL component carriers. In this example, a combination of the methods disclosed hereinabove may be implemented. The uplink carrier and the corresponding downlink carriers may be linked to each other. Several methods are available for transmitting the control data information. In an example, the control information transmitted on each uplink carrier (corresponding to one or several DL component carriers) may be coded separately. In another example, the control information transmitted on each uplink carrier corresponding to different downlink carriers may be coded separately. In yet another example, the control information transmitted over all uplink carriers may be coded jointly.

In another embodiment for mapping of CQI, PMI, RI and ACK/NACK to physical resource elements in carrier aggregation, frequency diversity/hopping over different uplink carriers may be implemented. The PUCCH data may be transmitted on different uplink carriers at different time instances. For example, when the PUCCH may be transmitted only on one uplink carrier at any time to maintain low PAPR, the PUCCH may be transmitted on different UL component carriers using intra-subframe or inter-subframe hopping. The same PUCCH can be repeated on different uplink carriers.

Disclosed hereinafter are the different reporting modes for the CQI information. In LTE, there are three main CQI reporting modes: WTRU selected, base station configured subband reporting and wideband reporting. In WTRU selected mode, the WTRU selects the best M subbands and reports the CQI and PMI to the base station. In the base station configured mode, the base station configures a set of subbands, and the WTRU reports the CQI/PMI of the whole set or a subset of the set.

In an example method for use with multiple downlink carriers, the CQI/PMI/RI for each downlink carrier may be selected independently. In another example method for use with multiple downlink carriers, all or several of the downlink carriers may form an aggregated bandwidth and the CQI/PMI/RI may be reported by using this bandwidth. The subbands selected may be different in each carrier or they may span more than one carrier. For example, if there are N carriers, each with k RBs, then a single carrier of Nk RBs may be assumed, and accordingly a wideband CQI/PMI and a single RI over Nk RBs may be reported. This approach may be more useful when the carriers are contiguous. The latter example method may be used when the aggregated carriers are contiguous and former example method may be used over sets of non-contiguous carriers.

For purposes of discussion, a WTRU has an 'assigned' carrier and possibly other 'associated' carriers. This is also referred to as "anchor" and "non-anchor" component carriers. The assigned carrier is a primary carrier that e.g., may correspond to the carrier that WTRU may monitor to for PDCCH information. The WTRU also has associated carriers (secondary) which are, for example, carriers that the WTRU is informed may have granted physical downlink shared channel (PDSCH) RBs, and thus CQI reporting may be required. Associated and assigned carriers may be semi-statically configured, but may also modified by discontinuous reception (DRX) periods, e.g., if one or more of the carriers is DRX for a WTRU, it may not be required to send CQI information that would correspond to a DRX time-frequency.

In one reporting example, the WTRU is informed via L1, L2/3, or broadcast signaling, which carriers within the LTE-A aggregation it should report the the best M subbands and CQI/PMI/RI information. The best M subbands are not preferentially from any particular component carrier.

In another reporting example, L1, L2/3, or broadcast signaling may be transmitted to the WTRU selecting the carriers within the LTE-A aggregation for which the WTRU should report the best M1 subbands and CQI/PMI/RI information, where M1 is associated with the subcarriers in an assigned carrier. Additionally the signal may select which component carriers within the LTE-A aggregation that the WTRU may report the best M2 subbands and CQI/PMI/RI information, where M2 is associated with the subcarriers in the associated carriers. For example, WTRU may be configured to report the best M1 subbands from the carrier it is assigned to listen for PDCCH and reports the best M2 subbands from K specific other carriers.

In another reporting example, L1, L2/3, or broadcast signaling may be transmitted to the WTRU that identifies or selects the carriers within the LTE-A aggregation for which the WTRU should report the best M subbands and CQI/PMI/RI information for each associated DL carrier, e.g., the CQI for best M subbands within each carrier are reported.

In another reporting example, L1, L2/3, or broadcast signaling may be transmitted to the WTRU that identifies or selects the carrier within the LTE-A aggregation for which the WTRU should report the wideband CQI, e.g., where the wideband CQI report corresponds to the carrier that the WTRU is assigned to listen to for the PDCCH, i.e., wideband assigned carrier CQI reporting.

In another reporting example, L1, L2/3, or broadcast signaling may be transmitted to the WTRU indicating which carriers are associated carriers within the LTE-A aggregation for which it should report carrier wide CQI/PMI/RI. The WTRU may be configured to transmit a network defined set of wideband CQI reports. Carrier wide is meant to cover the fact that "associated carriers" may mean multiple carriers and we want to report for all. In addition, separate reports for each of these component carriers may be sent.

In another reporting example, L1, L2/3, or broadcast signaling may be transmitted to the WTRU indicating which carriers are associated carriers within the LTE-A aggregation for which the WTRU should report the best M carrier wide CQI/PMI/RI information.

In another reporting example, L1, L2/3, or broadcast signaling may be transmitted to the WTRU selecting the carriers within the LTE-A aggregation for which the WTRU should report the aggregate CQI/PMI/RI information, i.e, an aggregate bandwidth wideband CQI.

In another reporting example, the WTRU may be informed for which carriers within the aggregation band it should report the best M carrier wide CQI/PMI/RI information and wideband CQI/PMI/RI information. For example, the WTRU may report best M CQI for the primary carrier but wideband CQI for the secondary carriers.

In each of the reporting examples, the WTRU may be informed as to which carriers a report should be transmitted or the WTRU may select the best M as appropriate.

The subband size for the frequency selective CQI/PMI/RI reports may be based on the number of RBs in the corresponding carrier for which the report is given. Alternatively, the subband sizes may be based on the full configuration bandwidth of the system. Alternatively, the subband sizes may be based on the sum bandwidth of the assigned and associated carriers. Alternatively, the subband sizes may be signaled by higher layers or broadcast.

Disclosed hereinafter are methods for transmitting sounding reference signals (SRS) to the base station. In LTE, a SRS may be transmitted to enable the base station to estimate the uplink channel. Example methods are disclosed for transmitting the SRS when there is more than one uplink carrier.

In an example method, the SRS may be transmitted in all or some of the uplink carriers. The carriers for which an SRS is required may be scheduled by L2/3 signaling and sounding may occur at the same time in all carriers. For example, carrier 1 may be sounded at subframe k, carrier 2 may be sounded at subframe k+n, etc. This is time and frequency multiplexing. The time difference between SRS's in different carriers may be fixed, or signaled by L2/3, or broadcast.

The power offset of SRS's in different carriers may be controlled by a carrier specific offset parameter and provided by higher layers.

In another example method, the SRS may be transmitted in all or some of the uplink carriers and each carrier may have an independent associated SRS schedule. The power offset of SRS's in different carriers may be controlled by a carrier specific offset parameter and provide by higher layers.

In another example method, the SRS may be transmitted in only one uplink carrier. This carrier may be configured by the base station.

In another example method, when an SRS transmission collides with the PUCCH, the methods for processing collisions in LTE such as puncturing of ACK/NACK, etc. may be used or, the PUCCH may be transmitted in another uplink carrier while the SRS is transmitted in the current carrier.

In another example method, non-overlapping frequency bands of uplink carriers may be sounded. For example, when two carriers of 20 MHz are used for uplink, 0-10 MHz of the first carrier and 10-20 MHz of the second carrier may be sounded.

In another example method, when contiguous carriers are aggregated a single SRS may be used to sound the whole transmission bandwidth.

Disclosed herein are example methods for ACK/NACK bundling and multiplexing. When there are multiple downlink carriers, there may be one or more multiple codewords for each downlink carrier. In the uplink, transmission of a ACK/NACK bit may be required for each codeword transmitted in the downlink.

A method to reduce the signaling overhead to transmit ACK/NACK bits may use bundling where the ACK/NACK bits for more than one codeword are "ANDed" together and a single ACK/NACK bit may be transmitted in the uplink. When PUCCH is mapped to one uplink component carrier, the ACK/NACK bit is transmitted on this uplink component carrier.

When each downlink carrier is used to transmit more than one codeword (e.g. two codewords), for example when MIMO is used, an example method may have the ACK/NACKs corresponding to the first and second codewords transmitted over the carriers combined together. The final two bits, one representing the aggregate ACK/NACK of the first codewords and the second representing the ACK/NACK of the second codewords, may be transmitted as a single ACK/NACK symbol with quadrature phase shift keying (QPSK) modulation.

When a downlink component carrier is used to transmit two or more codewords, an example method to reduce signaling overhead may have bundling occur such that a single ACK/NACK bit/symbol may be produced for one downlink component carrier.

Bundling may occur such that a single ACK/NACK bit corresponding to the transmission over all downlink component carriers is produced. For example, all ACK/NACK bits that correspond to all codewords transmitted on all downlink component carriers may be "AND"ed together. Alternatively bundling may occur such that several ACK/NACK bits that correspond to the transmission over all downlink component carriers may be produced.

As proposed above, the ACK/NACK control information may be mapped to one UE-specific uplink component carrier which is configured to carry the PUCCH.

The ACK/NACK bits may be transmitted by using frequency domain and time domain multiplexing with orthogonal codes, as in LTE. For example, if the maximum number of codewords transmitted over all downlink carriers is m, then there may be m bundled ACK/NACK bits. If QPSK modulation is used, this corresponds to m/2 ACK/NACK symbols. These bits/symbols may be transmitted by frequency/time/code multiplexing. Although "multiplexing" terminology is used, any form of combined reporting is applicable where multiple bits can be effectively reduced to a smaller subset of bits and still effectively represent the original set of bits.

In another embodiment for transmitting UCI in the PUCCH, it is assumed that when LTE Release 8 WTRUs and LTE-A WTRUs share the same physical resources to transmit on the PUCCH, code division multiplexing (CDM) spreading may be used to transmit data on PUCCH to maintain the orthogonality of the PUCCHs. CDM is a technique in which each channel transmits its bits as a coded channel-specific sequence of pulses.

In an example method for this embodiment, LTE-A WTRUs may spread their M modulation symbols with M spreading sequences and map the spreading sequences to M consecutive radio blocks (RBs). The M spreading sequences may be selected from the different root sequences or cyclic shifts of the same root sequence or a combination of both. The M sequences may be selected such that the resulting cubic metric (CM) is low. In order to obtain a low CM, the CM of all possible combinations for M sequences is computed and the set of combinations having the lowest CM is than pre-selected. These combinations may either be signaled to the WTRU by higher layer signaling, i.e., via WTRU-specific or cell-specific signaling.

In another example method for this embodiment, LTE-A WTRUs may spread their N modulation symbols with N cyclic shifts of the same root sequence and map the modulation symbols to the same RB. The N cyclic shifts for each root sequence may be selected such that the resulting CM is low. To achieve this, the CM of all possible combinations for N cyclic shifts is computed and the set of combinations with the lowest or acceptable CM is than pre-selected. These combinations may either be signaled to the WTRU by higher layer signaling, i.e., via WTRU-specific or cell-specific signaling.

In another example method for this embodiment, a combination of the first and second example methods disclosed hereinabove may be used to achieve transmission on PUCCH.

In another example method for this embodiment, spreading sequences such as Zadoff-Chu sequence (which belongs to the constant amplitude zero autocorrelation (CAZAC) sequence family) and other spreading sequences may be used when LTE-A WTRUs share the same resources.

In another embodiment for transmitting UCI in the PUCCH, it is assumed that the LTE Release 8 WTRUs and LTE-A WTRUs do not share the same physical resources to transmit on the PUCCH.

In this embodiment, a specific time-frequency location is reserved for the transmission of PUCCH data for LTE-A WTRUs. The location may be LTE-A specific, may be larger than that of reserved for LTE, and may use the same spreading sequences as in LTE.

Figure 4:
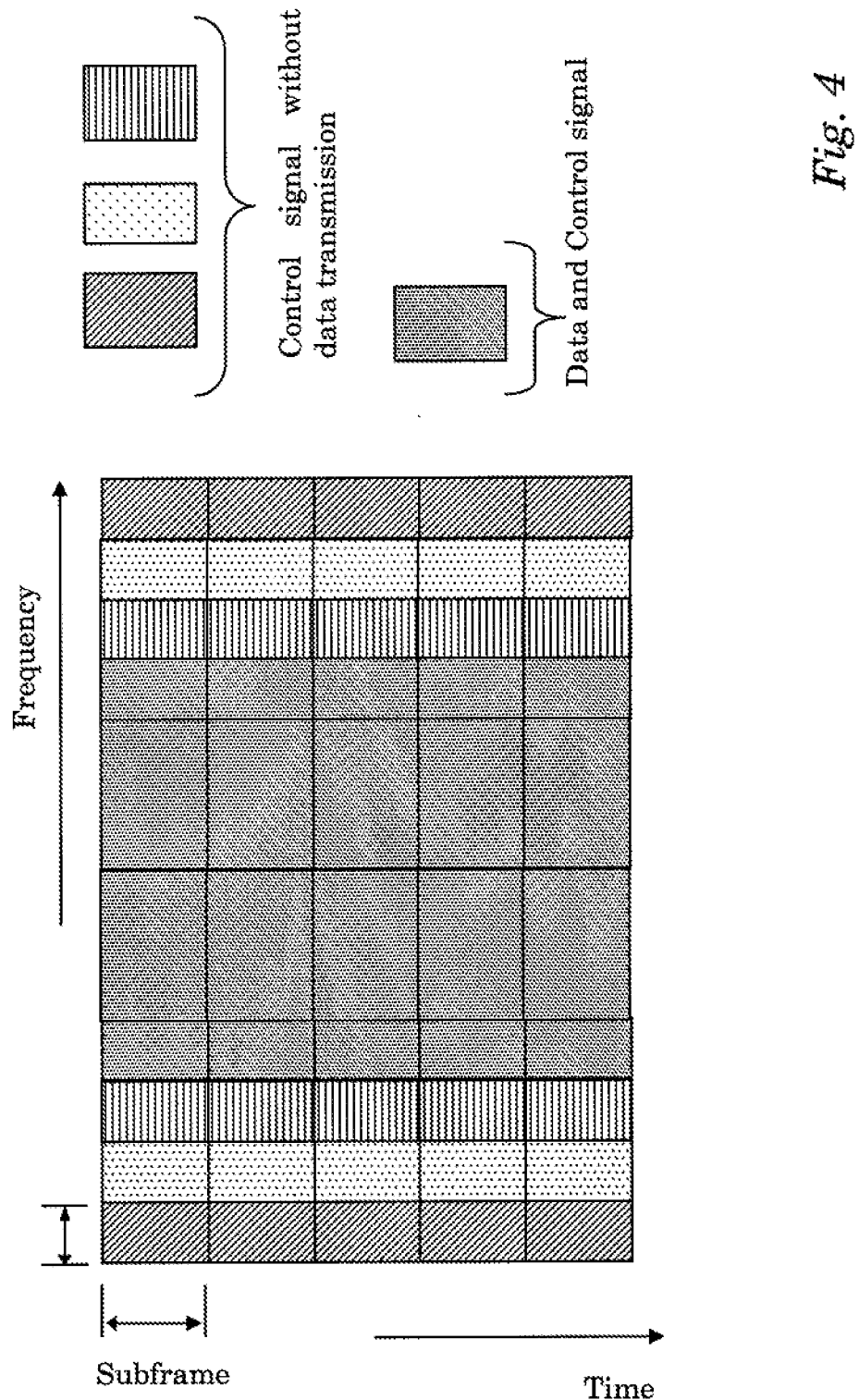
FIG. 4 shows an example of frequency multiplexing of control data.

In this embodiment, different multiplexing schemes may be used to achieve multiplexing the control data among different WTRUs. In an example method of this embodiment, the multiplexing of control data among different WTRUs may be achieved by using frequency division multiplexing (FDM) in frequency domain. As illustrated in FIG. 4, WTRUs may map their modulation symbols into different subcarriers in the reserved PUCCH resources. Each type of shading (i.e., cross-hatching, dots, vertical lines, etc) represents the allocation for a specific WTRU. Each WTRU uses the resources indicated with one shading only. One modulation symbol may be repeated over several consecutive or disjoint subcarriers and the control data may be discrete Fourier transform (DFT) precoded in order to keep the CM low.

The reserved PUCCH resources may consist of localized subcarriers or distributed subcarriers over a large (or even over the whole) frequency band. In addition, the reserved PUCCH resources may consist of clusters of localized subcarriers or sets of distributed subcarriers over a pre-defined frequency band. The control data may be repeated over several orthogonal frequency division multiplexing (OFDM) symbols to improve coverage. Furthermore, block spreading (i.e., spreading in time over OFDM symbols by orthogonal codes such as Walsh codes), may also be used.

In another multiplexing example, multiplexing of control data among different WTRUS may be achieved by using code division multiplexing (CDM). In this example method, a modulation symbol is spread with a spreading sequence, i.e., with CAZAC sequences over 1 RB. Several (same or different) sequences maybe used over different consecutive RBs to increase the data rate. The DFT-precoding may be applied after spreading in to reduce the CM.

The number of transmitted control bits of a WTRU may be increased by transmitting several orthogonal sequences over the same frequency band, for example, by transmitting cyclic shifts of the same root sequence over the same RB. DFT-precoding may be also applied after spreading with multiple orthogonal sequences, due to the fact that when CAZAC sequences, the cyclic shifts of the same root sequence maintain orthogonality even after DFT. Due to the ability to maintain this orthogonality, this example method may also be used when LTE and LTE-A WTRUs share the same physical resources for PUCCH transmission, as per the first embodiment. Accordingly, pursuant to this embodiment, the control data of LTE-A WTRUs is spread using a CAZAC sequence, then the data is DFT precoded and mapped to subcarriers on an inverse fast Fourier transform (IFFT) block. Note that the control data may be repeated over several OFDM symbols, for example, for coverage improvement.

The sequence selection methods previously disclosed with respect to the first embodiment may also be used to maintain low PAPR/CM. In this case, the combinations among all possible combinations of sequences with low CM may be selected, resulting in low CM even without DFT-precoding. The combinations may be signaled to the WTRU by higher layer signaling, i.e. via WTRU specific or cell-specific signaling.

In the embodiment where LTE Release 8 WTRUs and LTE-A WTRUs do not share the same physical resources to transmit on the PUCCH, hopping may be used to achieve better frequency diversity. Hopping may be implemented by transmitting control information on different frequency bands between slots, between subframes, or between component carriers, or any combination of frequency bands, slots, subframes and component carriers. The control data may also be transmitted on more than one component carrier simultaneously for signal to interference+noise ration (SINR) improvement.

In accordance with the embodiment where LTE Release 8 WTRUs and LTE-A WTRUs do not share the same physical resources to transmit on the PUCCH, when orthogonal frequency division multiple access (OFDMA) is used as a complementary air interface for uplink transmission, the first and the second embodiments may also be used. However, in this case DFT precoding is not required since CM is not an issue. The transmission method may be specified or configured by WTRU or cell-specific signaling.

In another embodiment for transmitting or signaling UCI in the PUCCH, UCI may be signaled over multiple PUCCH resources using CDM, FDM, time division multiplexing (TDM) or a combination thereof. This embodiment may be used, for example, when high volume UCI is required for LTE-A.

Figure 5:
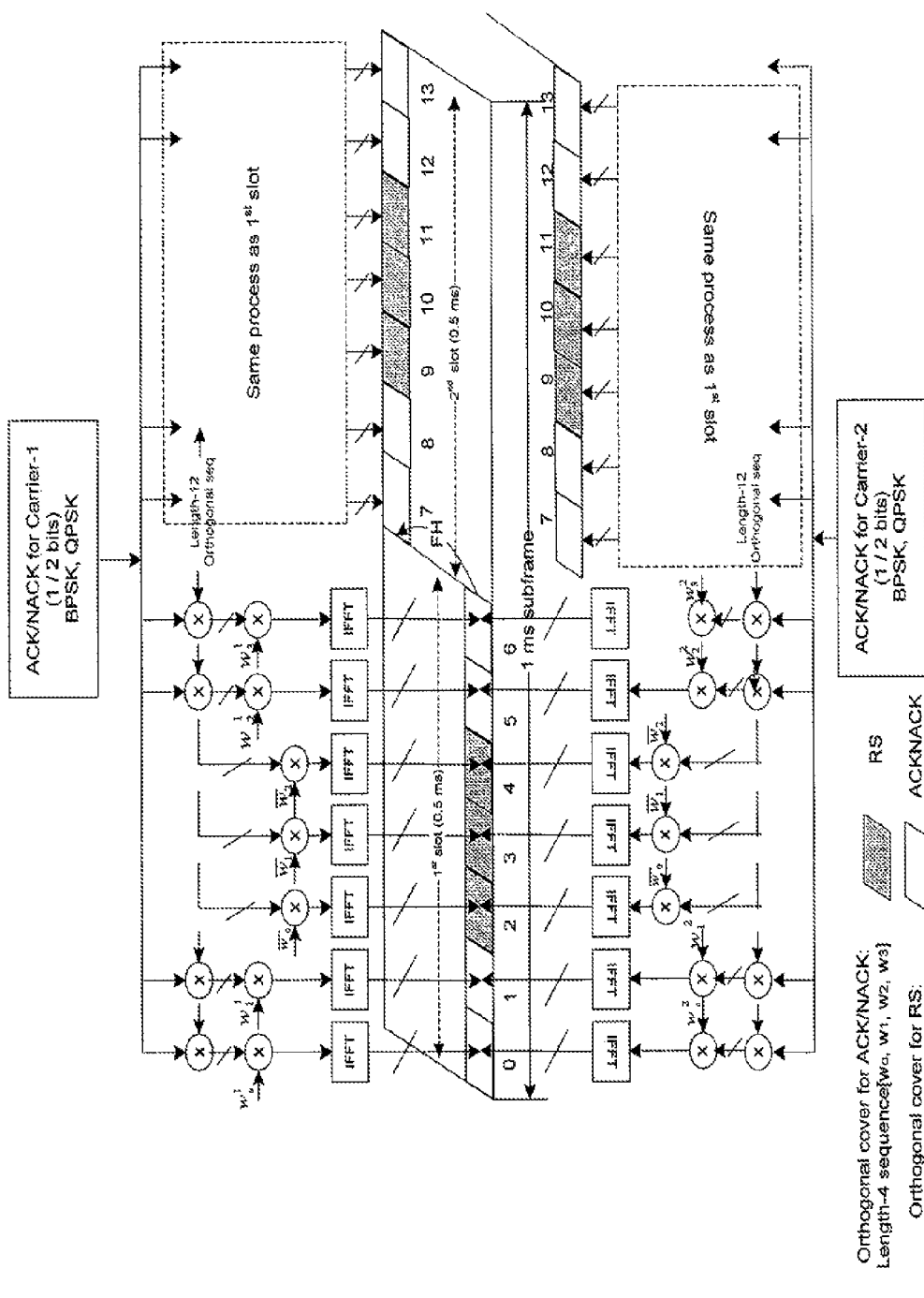
FIG. 5 shows an example of code division multiplexing based acknowledgement/non-acknowledgement transmission in asymmetric carrier aggregation.

In an example method of this embodiment, CDM based UCI signaling may be used. In CDM, different orthogonal phase rotations (equivalently cyclic shifts) of a cell-specific length-12 frequency domain (or time domain) sequence are applied for each bit (or a group of bits, or different control fields) of UCI. For example, in the case of asymmetric bandwidth extension (such as 2 downlink (DL) component carriers and 1 uplink (UL) component carrier), HARQ ACK/NACK bits for different DL component carriers are transmitted in a single UL carrier using different phase rotations of a cell-specific sequence. Alternatively or additionally, as shown in FIG. 5, ACK/NACK bits for different DL carriers may be transmitted (on the same time-frequency resource) using the same phase rotated sequence, but using different orthogonal cover sequences, $w^1$ and $w^2$ for Carrier-1 and Carrier-2, respectively.

Figure 6:
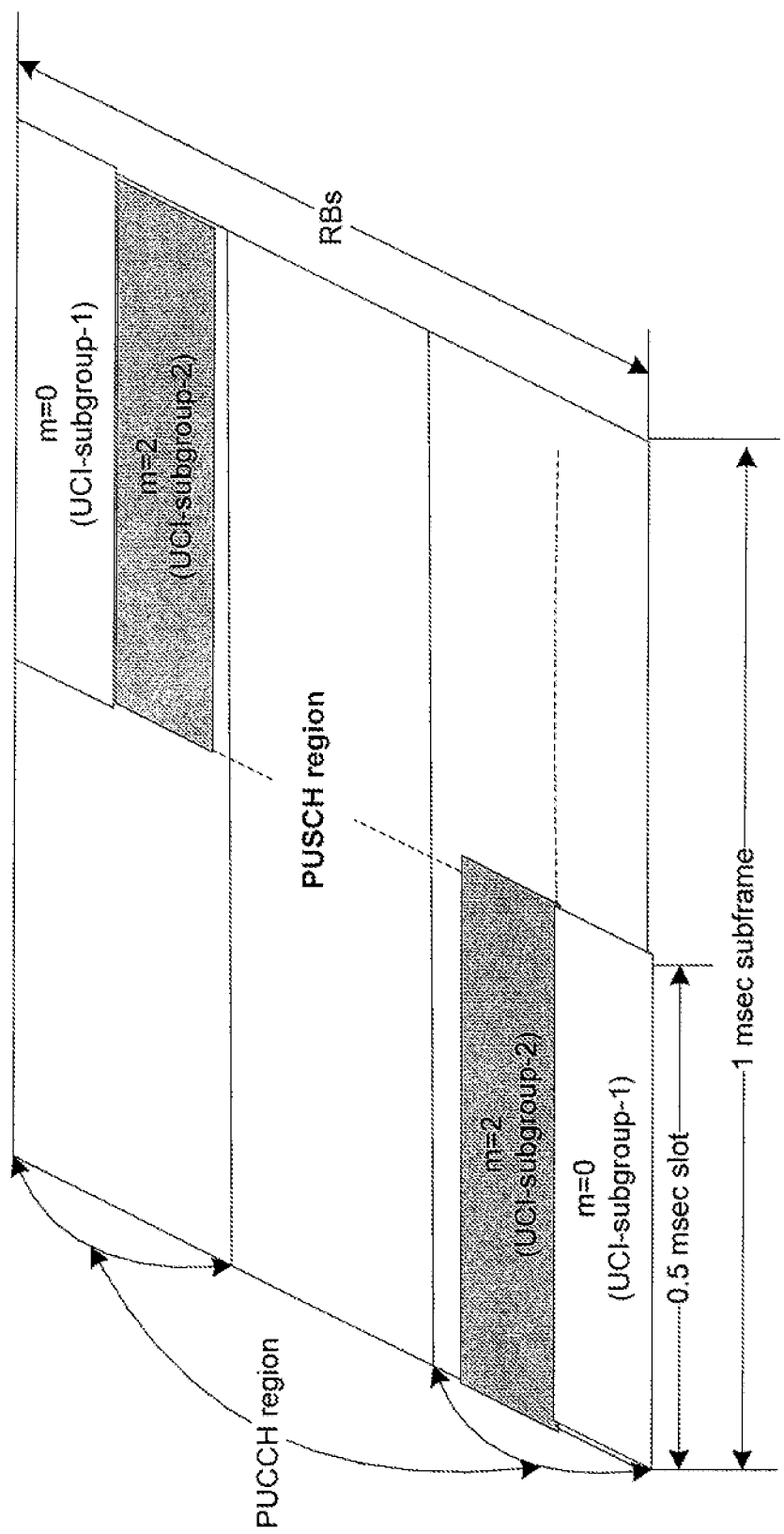
FIG. 6 shows an example of frequency division multiplexing based on uplink control information (UCI) transmission using multiple physical uplink channel (PUCCH) resource blocks.

In another example method of this embodiment, FDM based UCI signaling is used where each bit (or a group of bits like ACK/NACK bits and CQI bits, or different control fields) of UCI may be transmitted using a different RB pair within a pre-configured PUCCH region (i.e., PUCCH resources). FIG. 6 shows an example of using multiple PUCCH RB resources (i.e., FDM based) for transmitting high volume UCI (e.g., multiple UCI reports) such that ACK/NACK is transmitted over the RB corresponding to m=0, while CQI/PMI/RI is transmitted over a different RB like the RB corresponding to m=2. Alternatively or additionally, in the case of asymmetric bandwidth extension (such as 2 DL component carriers and 1 UL component carrier). UCI bit(s) for different DL component carriers are transmitted over different RB pairs such as m0, 2 for Carrier-1 and Carrier-2, respectively.

In another example method of this embodiment, TDM based UCI signaling is used where each bit (or a group of bits like ACK/NACK bits and CQI bits, or different control fields) of UCI is transmitted with time division base (TDB) on an OFDM symbol basis, on a slot basis, or on a subframe basis.

In another example method of this embodiment, high order modulation based UCI signaling is used. Higher order modulation may be applied such as 16 quadrature amplitude modulation (16QAM) for PUCCH to deal with high volume UCI in LTE-A. In this example, the power setting for PUCCH includes a power offset to reflect the fact that different SINR is required for different modulation schemes.

In the embodiments disclosed herein, the WTRU may be configured by the base station through higher layer signaling or L1 signaling regarding which PUCCH resources (time/frequency/code) are allocated to the WTRU. The Release 8 LTE PUCCH formats may be backward compatible. In addition, in the case of CDM and FDM, the CM (cubic metric) may be increased depending on the number of resources (codes/phase rotations or RBs) in use. Accordingly, the impact of CM on the power setting for PUCCH may be considered, that is, applying a power backoff by an amount of the CM increase, if any.

Methods for providing flexible configuration in signaling UCI, efficient resource utilization, and support for high volume UCI overhead in LTE-A are disclosed hereinafter with respect to physical uplink shared control channel (PUSCH).

In an embodiment, one or multiple periodic PUSCH reporting modes may be used to support UCI reporting for high volume variable size WTRU feedback information or UCI information. Periodic PUSCH is used for transmitting large size WTRU feedback or UCIs corresponding to multiple carriers. In this example method, it is assumed that multiple CQIs, PMIs, RIs, CSIs, etc. may be needed for multiple carriers. For a single carrier, one UCI i.e. one set of CQI, PMI, RI, etc. is required to be fed back from the WTRU to the base station. For multiple carriers, multiple sets of CQI, PMI, RI, etc. are required to be fed back from the WTRU to the base station. This may significantly increase the amount of WTRU feedback information. The number of carriers that are configured may change (likely in a semi-static manner), and the size of WTRU feedback may vary accordingly.

Periodic PUSCH may also be used for transmitting UCI for multiple-input multiple-output (MIMO). In this example it is assumed that high order MIMO may require large size UCIs to be fed back e.g., large codebook size may be needed for high order MIMO. In addition, different types of WTRU feedback such as channel quantization instead of codebook index or PMI may be needed. This contributes to increased payload size for UCI.

Periodic PUSCH may also be used for transmitting UCI for coordinated multipoint transmission (CoMP). In this example it is assumed that large payload size UCIs may be needed to enable advanced CoMP schemes. Channel quantization instead of codebook index (e.g., PMI) may be needed to enable advanced CoMP schemes. Multiple PMIs or CSIs etc. for different cells, sites, base stations, etc. in coordinated group may be needed for certain CoMP schemes. Different CoMP schemes e.g., joint transmission, coordinated beamforming, etc. may require different amount of PMIs, CSIs, etc.

If joint transmission based CoMP, one composite CSI or PMI for multiple cells/sites/base stations may be sufficient. This is because transmission comes from multiple antennas of multiple sites jointly. Composite channel can be measured in RS. If coordinated beamforming is used, multiple CSI or PMI for multiple cells/sites/base stations may be needed. This is because the WTRU may feed back h1 (e.g., CSI1), and h2 (e.g., CSI2) to base station 1 and base station 1 may forward h2 (CSI2) to base station 2 which may form a beam to another WTRU with h3 (e.g., CSI3) but try to minimize the interference via h2 to the given WTRU. So both h1 (e.g., CSI1) and h2 (CSI2) may need to feed back to base station 1.

Periodic PUSCH may also be used for UCI transmission for frequency selective precoding or beamforming. Frequency selective reporting or subband reporting may require multiple UCI feedback, e.g., multiple PMIs, CSIs. etc. may be reported for different subbands within carrier.

An example method for using an uplink data channel to carry UCI is disclosed herein. A periodic uplink data channel may be used, such as for example, PUSCH to carry WTRU feedback information or UCI. One or several periodic PUSCH reporting modes are added to support periodic PUSCH-based reporting for carrier aggregation (multi-carrier for bandwidth extension), high order MIMO, CoMP and frequency selectivity. A summary of Physical Channels for aperiodic or periodic CQI reporting are shown in Table 1.

TABLE 1

Physical Channels for Aperiodic or Periodic CQI reporting

| Scheduling Mode | Periodic CQI reporting channels | Aperiodic CQI reporting channel |
|---|---|---|
| Frequency non-selective | PUCCH | |
| Frequency selective | PUCCH, PUSCH | PUSCH |
| Carrier aggregation | PUSCH | |
| High order MIMO/CoMP | PUSCH | |

Several reporting modes based on periodic PUSCH are disclosed herein. A WTRU is semi-statically configured by higher layers to periodically feed back different CQI, PMI, CSI, and RI or their combinations on the PUSCH. CQI, PMI, CSI, RI, etc. or their combinations may be defined for each reporting mode. For example, one possibility is to have a reporting mode to report the same CQI, PMI, RI carried by periodic PUCCH for a single carrier but extend it to multiple carriers. In this case N sets of CQI, PMI, RI, etc. for N carriers may be associated with this reporting mode and are reported in periodic PUSCH. It may follow the same periodic PUCCH reporting but aggregate WTRU feedback information CQI, PMI, RI, etc. from multiple carriers and report them in periodic PUSCH. In frequency selective case, it may report CQI, PMI, etc. corresponding to multiple carriers, e.g., different bandwidth parts in different subframes.

It may also be possible to report all CQI, PMI, etc. e.g., of all different bandwidth parts in the same subframe instead of in different subframes. Another possibility is to define new CQI, PMI, RI, CSI, etc. and their combinations to be reported for different reporting modes using periodic PUSCH. Different combinations of CQI, PMI, CSI or RI, etc. may be defined for multiple carriers, high order MIMO, CoMP, frequency selectivity or combination of them.

In addition, if different transmission modes are supported for carriers, combinations of CQI, PMI, CSI or RI, etc. may also be defined for reporting for such cases. Furthermore if each carrier may be linked to different cells, sites, base stations in CoMP and CoMP group size may be different for different carriers, combinations of CQI, PMI, CSI or RI, etc. may also be defined for reporting for such case.

Some example reporting modes are given in Tables 2 and 3, where WB CQI stands for wideband CQI. SB CQI stands for subband CQI.

TABLE 2

Example CQI and PMI Feedback Types for Periodic PUSCH reporting Modes for Carrier aggregation

| | | PMI Feedback Type | |
|---|---|---|---|
| | | No PMI | Single PMI per Carrier |
| Feedback Type | Wideband (wideband CQI) | Mode 1-0 e.g., N WB CQI for N carriers | Mode 1-1 e.g., N WB PMI for N carriers |
| PUCCH CQI | WTRU Selected (subband CQI) | Mode 2-0 e.g., N sets of SB CQI for N carriers | Mode 2-1 e.g., N sets of SB CQI for N carriers N WB PMI for N carriers |

TABLE 3

Example CQI and PMI/CSI Feedback Types for Periodic PUSCH reporting Modes for high order MIMO/CoMP

| | | PMI Feedback Type | |
|---|---|---|---|
| | | No PMI | Single PMI/ CSI per Carrier |
| Feedback Type | Wideband (wideband CQI) | Mode 1-0 e.g. N WB CQI for N carriers | Mode 1-1 e.g., N WB PMI/CSI for N carriers |
| PUCCH CQI | WTRU Selected (subband CQI) | e.g., Mode 2-0 N sets of SB CQI for N carriers | Mode 2-1 e.g., N sets of SB CQI for N carriers, N WB PMI/CSI for N carriers |

In another example for sending high volume UCI on PUSCH, when the UCI payload size is large (such as the sum of the number of HARQ bits and number of information bits for CQI/PMI/RI is larger than a threshold), so that it cannot fit into a PUCCH resource, the UCI is sent on PUSCH with or without uplink shared channel (UL-SCH) data (depending on whether the WTRU has been scheduled for data transmission or not). In this method, it is not necessary that the WTRU has been scheduled for data transmission on PUSCH to carry the UCI. Rather, the WTRU may be configured by higher layer signaling or L1/2 signaling when the UCI is carried on PUSCH.

Disclosed hereinafter are methods for configuring periodic PUSCH, indicating resources, and other related procedures. Periodic PUSCH may be configured for transmitting UCI via radio resource control (RRC) configuration. RRC configuration may include release, setup of periodic PUSCH reporting mode, reporting interval or periodicity, reporting formats, etc.

Disclosed herein are different methods for indicating periodic PUSCH resources. In an example, the indication may be done using the physical downlink control channel (PDCCH). In conjunction with RRC configuration, PDCCH may be used to indicate the periodic PUSCH resource, e.g., resource size, RB allocation, etc. Periodic PUSCH resource size may be different due to e.g., different carrier aggregation configurations, etc. In another example, periodic PUSCH resources may be indicated using a fixed allocation. Resources may be reserved for periodic PUSCH (similar to resources reserved for periodic PUCCH). Reserved resources for periodic PUSCH may be located in fixed locations (e.g., edge of bandwidth for frequency diversity). The reserved PUSCH resources may be partitioned into several partitions. An indication to which periodic PUSCH resources (e.g., partition) to use may be configured by higher layer signaling e.g., RRC.

PDCCH may be transmitted to indicate periodic PUSCH resources in the scheduled reporting interval after RRC configuration. Several methods to indicate periodic PUSCH resources are disclosed herein.

In an example method, a static indication is used. In this method, PDCCH is used to indicate parameters such as resources, etc. for periodic PUSCH in the beginning. After that the parameters remain the same until periodic PUSCH is released by RRC. If PDCCH is received and PDSCH is decoded successfully, resources, etc. for periodic PUSCH is indicated. The same parameters e.g. RB allocation are used for periodic PUSCH until released by RRC. In one example, only periodic PUSCH may be allowed to be transmitted in scheduled interval. In one example, concurrent transmission of periodic PUSCH (control) and PUSCH (data) may also be allowed. In this case in the subsequent intervals, PDCCH UL assignment may be used for data PUSCH and not for periodic PUSCH.

In an example method, a semi-static indication is used. In this method, PDCCH is used to indicate resources, etc. for periodic PUSCH not only in the beginning but also in the subsequent reporting intervals. In other words parameters such as resources, etc. may be changed in the next reporting instance. This may achieve scheduling gain for each reporting instance. PDCCH may be transmitted in every interval. In this case RB allocation may be changed dynamically in each scheduled reporting interval for periodic PUSCH. The WTRU may monitor PDCCH for periodic PUSCH in each scheduled reporting interval. The base station may or may not transmit PDCCH corresponding to periodic PUSCH in every scheduled interval. Periodic PUSCH (control) and PUSCH (data) may merge on PUSCH resources and share the grant. CQI request bit may be used to indicate if the grant received in the scheduled reporting interval is applied to periodic PUSCH (control) only or applied to both periodic PUSCH (control) and PUSCH (data).

In an example method, another semi-static indication is used. In this method, to reduce signaling overhead, only for every L reporting interval the PDCCH may be sent for periodic PUSCH. In this case. WTRU may only need to monitor PDCCH for periodic PUSCH in every L scheduled reporting interval. This may reduce the flexibility since PDCCH may not be transmitted in every scheduled interval for periodic PUSCH, however it reduces the complexity that WTRU has to monitor and decode PDCCH every interval. This may be applied if only periodic PUSCH is allowed to be transmitted in the scheduled interval.

Disclosed hereinafter are different methods on how periodic PUSCH may be activated or released for transmitting UCI using PDCCH. In one method, periodic PUSCH may be activated via PDCCH and once it is activated, the WTRU may report UCIs periodically using periodic PUSCH resources until it is de-activated. In another method, after periodic PUSCH reporting mode is configured by RRC, activation PDCCH is used to activate periodic PUSCH reporting mode. Activation PDCCH also indicates the periodic PUSCH resources. In another method, deactivation of periodic PUSCH may be done via another PDCCH which releases periodic PUSCH reporting.

Disclosed herein are implementation embodiments to configure uplink data channel for transmitting UCI. In Release 8 LTE, the periodic CQI reporting mode is given by the parameter, cqi-FormatIndicatorPeriodic which is configured by higher-layer signaling. In one example, the periodic PUSCH-based CQI reporting mode is given by the parameter X e.g., cqi-FormatIndicatorPeriodicPUSCH which is configured by higher-layer signaling. Depending on transmission mode, reporting mode is implicitly given.

In another method, the periodic PUSCH-based CQI reporting mode is given by the parameter Y e.g., cqi-ReportModePeriodicPUSCH which is configured by higher-layer signaling. Reporting mode is explicitly given via this parameter.

In Release 8 LTE, the CQI/PMI or RI report shall be transmitted on the PUCCH resource $n_{PUCCH}^{(2)}$, where $n_{PUCCH}^{(2)}$ is WTRU specific and configured by higher layers.

Disclosed herein are methods for determining which PUSCH resources are used for transmitting UCI information. In one method, the CQI/PMI or RI report may be transmitted on the periodic PUSCH resource, which is WTRU specific and is indicated by a WTRU-specific PDCCH. Alternatively, periodic PUSCH resources may be configured by higher layers. RBs allocation, modulation code scheme (MCS), etc. for periodic PUSCH resources may be indicated using L1/2 control signaling e.g., PDCCH signaling or higher layer signaling e.g., RRC signaling.

Disclosed herein are methods to configure periodic PUSCH reporting and resource indication. In one method, configuration is done using RRC signaling. RRC configuration may include release, setup of periodic PUSCH reporting mode, reporting interval or periodicity, reporting formats, etc. All the parameters e.g., resource, RB location, MCS, etc. are sent via RRC signaling.

In another method, configuration is done via RRC/PDCCH. Some parameters, e.g., reporting mode, periodicity, etc. are sent via RRC signaling, and the other parameters e.g., resources, RB location, MCS, etc. are indicated via L1 control signaling e.g., PDCCH.

In another method, configuration is done via RRC/PDCCH with code-point validation. Some parameters, e.g., reporting mode, periodicity, etc. are sent via RRC signaling, and the other parameters e.g., resources, RB location, MCS, etc. are indicated via L1 control signaling e.g., PDCCH. In addition some code-points are defined for PDCCH validation. Validation is achieved if all the fields for the respective used downlink control indicator (DCI) format are set according to, for example, as shown in Table 4. If validation is achieved, the WTRU may consider the received DCI information accordingly as a valid periodic PUSCH activation.

TABLE 4

Special fields for Periodic PUSCH Activation PDCCH Validation

| | DCI format 0 |
| --- | --- |
| TPC command for scheduled PUSCH | NA or set to '00' |
| Cyclic shift DM RS | set to '000' |
| Modulation and coding scheme and redundancy version | NA or MSB is set to '0' |
| HARQ process number | N/A |
| Modulation and coding scheme | N/A |
| Redundancy version | N/A |

In another method, configuration is done via RRC with PDCCH activation/release. Some parameters, e.g., reporting mode, etc. are sent via RRC signaling, and other parameters e.g., resources, etc. are indicated via L1 control signaling e.g., PDCCH. In addition some code-points are used for PDCCH validation. During the time or period of periodic PUSCH, periodic PUSCH reporting may be dynamically turned on and off. This may be achieved by PDCCH activation and release. Validation is achieved if all the fields for the respective used DCI format are set according to, for example, Table 4 or Table 5. If validation is achieved, the WTRU may consider the received DCI information accordingly as a valid periodic PUSCH activation or release. If validation is not achieved, the received DCI format shall be considered by the WTRU as having been received with a non-matching cyclic redundancy check (CRC).

TABLE 5

Special fields for Periodic PUSCH Release PDCCH Validation

| | DCI format 0 |
| --- | --- |
| TPC command for scheduled PUSCH | NA or set to '00' |
| Cyclic shift DM RS | set to '000' |
| Modulation and coding scheme and redundancy version | NA or set to '11111' |
| Resource block assignment and hopping resource allocation | NA or Set to all '1's |
| HARQ process number | N/A |
| Modulation and coding scheme | N/A |
| Redundancy version | N/A |
| Resource block assignment | N/A |

Disclosed herein are example procedures for PDCCH indication methods. When periodic PUSCH is enabled by RRC, the following information may be provided by higher layer: periodic PUSCH interval periodicPUSCHInterval and number of empty transmissions before implicit release implicitReleaseAfter, if periodic PUSCH is enabled. When periodic PUSCH is disabled by RRC, the corresponding configured grant may be discarded.

After a periodic PUSCH uplink grant is configured, the WTRU may consider that the grant for periodic PUSCH recurs in each subframe for which:

$-(10*SFN+\text{subframe})=[(10*SFN_{start\ time}+\text{subframe}_{start\ time})+N*\text{PeriodicPUSCHInterval}+\text{Subframe\_Offset}*(N\ \text{modulo}\ 2)]\ \text{modulo}\ 10240$, for all $N>0$.

where SFNstart time and subframestart time are the sequence frame number (SFN) and subframe, respectively, at the time the configured uplink grant for periodic PUSCH were (re-)initialised.

The WTRU may clear the configured uplink grant immediately after transmitting the implicitReleaseAfter number of consecutive new PUSCH each containing zero or empty PUSCH on the periodic PUSCH resource.

Disclosed herein are procedures for addressing collisions between CQI/PMI/RI reporting and HARQ-ACK/NACK. In case of a collision between periodic PUSCH-based CQI/PMI/RI and HARQ ACK/NACK in the same subframe, CQI/PMI/RI is dropped if the parameter simultaneousAckNackAndCQI provided by higher layers is set to FALSE. ACK/NAK is piggybacked on or attached to CQI/PMI/RI on periodic PUSCH resources otherwise.

Disclosed herein are procedures for addressing collisions between CQI/PMI/RI reporting and PUSCH data. A WTRU may transmit periodic CQI/PMI, or RI reporting on PUSCH (control) in subframes with no PUSCH (data) allocation. A WTRU may transmit periodic CQI/PMI or RI reporting on periodic PUSCH (control) in subframes with PUSCH (data) allocation, where the WTRU may use the same but aggregated PUCCH-based periodic CQI/PMI or RI reporting format on PUSCH (data). Alternatively a WTRU may transmit periodic CQI/PMI or RI reporting on periodic PUSCH (control) in subframes with PUSCH (data) allocation, where the WTRU may use the PUSCH-based periodic CQI/PMI or RI reporting format on PUSCH (data).

Disclosed herein are procedures for addressing collisions between CQI/PMI/RI reporting and scheduling request (SR). In case of a collision between CQI/PMI/RI and positive SR in a same subframe, SR is piggybacked on or attached to CQI/PMI/RI on periodic PUSCH resource. Alternatively CQI/PMI/RI may be dropped and no periodic PUSCH is transmitted in that subframe if positive SR is in the subframe.

Disclosed herein are procedures for handling of measurement gaps for periodic PUSCH. In a subframe that is part of a measurement gap, the WTRU should not perform the transmission of periodic PUSCH.

Disclosed herein are procedures for handling of discontinuous reception (DRX) for periodic PUSCH. If the WTRU is not in DRX Active Time, periodic PUSCH should not be transmitted and periodic CQI, PMI, CSI, RI, etc. carried on periodic PUSCH should not be reported.

Disclosed herein are methods for transmission of control data together with user data in PUSCH. In an example, when clustered DFT-S-FDMA or OFDMA is used in the uplink and there is a single DFT and IFFT block, the PUCCH data may be multiplexed with data before the DFT.

In another example, when N×IFFT is used in the uplink and there are separate DFT and IFFT blocks, then several methods may be used.

In one example method, separately coded control information may be multiplexed with data before some or all of the DFT blocks. For example, separately coded CQI information corresponding to two downlink carriers can be multiplexed with data before the DFT of the primary uplink carrier. Alternatively, if there is more than one uplink carrier, each may carry different control data corresponding to the downlink carriers. For example, uplink carrier 1 may transmit CQI information for downlink carriers 1-3, and uplink carrier 2 may transmit CQI information for downlink carriers 4-5. In another method, different symbols of jointly coded control information may be multiplexed with data before several DFTs. In yet another method, the symbols of the same separately coded control information may be multiplexed with data before several DFTs. Additionally, the same control information may be transmitted over all or some of the DFT-IFFT pairs to improve the coverage.

Disclosed herein are methods for transmitting UCI information using PUCCH(s) and PUSCH. In LTE-A, the single-carrier constraint on the UL waveform is relaxed by supporting frequency-non-contiguous RB allocation on each component carrier. In addition, it is assumed to allow concurrent transmission of PUSCH and PUCCH from a WTRU, where UCI bits are conveyed by the pre-specified PUCCH resources while data bits are transmitted on PUSCH.

In one example, high volume UCI may be transmitted on both PUSCH and PUCCH(s) from a WTRU. If the WTRU does not have any data to be transmitted, then UCI is sent on PUSCH without UL data. For instance, a WTRU in DL CoMP may transmit UCI (including ACK/NACK, CQI/PMI/RI, and SR) associated with the serving (anchor) cell over the PUSCH intended for the serving cell, while in the same subframe the WTRU may transmit other control information (e.g., CQI/PMI) targeting non-serving (anchor) cells over a pre-specified PUCCH(s) for that recipient cell(s), or vice-versa.

Figure 7:
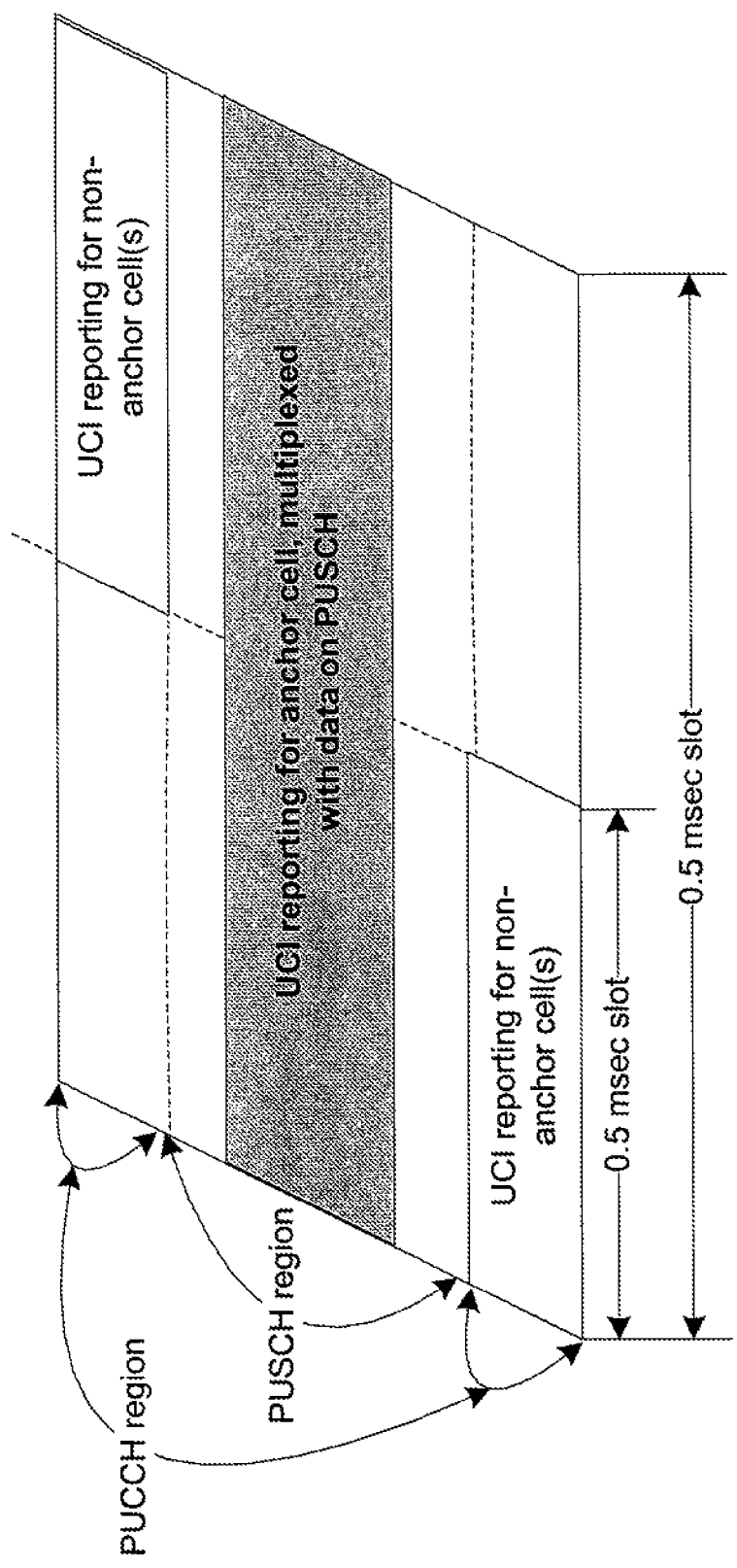
FIG. 7 shows an example of transmitting high volume UCI on both the PUCCH and physical uplink shared channel (PUSCH) from a WTRU in downlink coordinated multipoint transmission and reception.

FIG. 7 illustrates an example of transmitting UCI on both PUCCH(s) and PUSCH from a WTRU in DL CoMP. In this example, it is assumed that the WTRU has UL-SCH data transmitted in the subframe. If the WTRU does not have any data to be transmitted at that time, UCI is sent on PUSCH without UL data.

Alternatively or additionally, in the case of asymmetric carrier aggregation (e.g., 1 UL carrier and N DL carriers where N>1), the WTRU may transmit UCI associated with the anchor carrier over either PUSCH or PUCCH(s). At the same time, the WTRU may transmit UCI for non-anchor carrier(s) over the other physical channel (unused for the anchor carrier)

It is anticipated that in LTE-A, the power setting for PUSCH and PUCCH, respectively, is done independently. In the case of transmitting UCI over both PUSCH and PUCCH (s), when Pmax is reached (i.e., the case of negative power headroom), power backoff procedures may need to be used including equal power schemes, relative power schemes or priority schemes. They may include the power backoff approach with equal power, relative power, or priority.

Alternatively or additionally, the WTRU may switch to multiple PUCCH resources as disclosed herein or transmit UCI on PUSCH only. The WTRU may also piggyback the UCI signaling to Release 8 LTE.

Disclosed herein are methods for supporting simultaneous (periodic) PUCCH and (aperiodic) PUSCH transmission for UCI information. In Release 8 LTE, in case of collision between periodic CQI/PMI/RI report and aperiodic CQI/PMI/RI, periodic CQI/PMI/RI reporting is dropped in that subframe. In LTE-A, in one example, the WTRU is configured to transmit both the aperiodic report and periodic report in the same subframe from a WTRU, if necessary. For instance, in asymmetric carrier aggregation, the WTRU may be configured to perform periodic CQI/PMI/RI reporting associated with the anchor carrier using PUCCH and to perform aperiodic CQI/PMI/RI reporting associated with non-anchor carrier(s) using the PUSCH, or vice versa, in the same subframe. When Pmax is reached (i.e., the case of negative power headroom), the WTRU may piggyback on the Release 8 LTE UCI signaling procedure.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, Mobility Management Entity (MME) or Evolved Packet Core (EPC), or any host computer. The WTRU may be used in conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

What is claimed is:

1. A method for transmitting uplink control information with carrier aggregation, comprising:
   determining at least one uplink component carrier and at least two downlink component carriers;
   encoding uplink control information (UCI) associated with the at least two downlink component carriers, wherein the UCI associated with the at least two downlink component carriers is jointly coded;
   mapping the jointly coded UCI associated with the at least two downlink component carriers to resource blocks that are used for reporting carrier aggregation based uplink control information; and
   transmitting the mapped UCI on physical uplink control channel (PUCCH) carried by a single uplink component carrier of the at least one uplink component carrier.

2. The method as in claim 1, wherein the at least one uplink component carrier is configured by a base station.

3. The method as in claim 1, wherein the at least one uplink component carrier is signaled by at least one of radio resource controller signaling, higher layer signaling, or L1 signaling.

4. The method as in claim 1, wherein the at least one uplink component carrier is selected by a wireless transmit/receive unit (WTRU).

5. The method as in claim 1, further comprising allocating different sets of resource blocks for different sequence lengths.

6. The method as in claim 1, wherein different data symbols are spread with same cyclic shifts and mapped on different sets of resource blocks.

7. The method as in claim 1, wherein different data symbols are spread with different cyclic shifts and mapped on same sets of resource blocks.

8. The method as in claim 1, wherein different data symbols are spread with different cyclic shifts and mapped on different sets of resource blocks.

9. The method as in claim 1, wherein a power-limited wireless transmit/receive unit (WTRU) uses an adaptive transmission scheme that restricts the amount of UCI being transmitted.

10. The method as in claim 1, wherein a power-limited wireless transmit/receive unit (WTRU) uses an adaptive transmission scheme that uses more than one subframe to transmit the UCI.

11. The method as in claim 1, wherein the carrier aggregation based resource blocks transmitted on the PUCCH are allocated to WTRUs for reporting carrier aggregation based control information.

12. The method as in claim 11, wherein the UCI corresponds to hybrid automatic repeat request (HARQ) feedback for the at least two downlink component carriers.

13. A wireless transmit receive/unit (WTRU) comprising a transceiver operably connected to a processor, the processor configured to:
   determine at least one uplink component carrier and at least two downlink component carriers;
   encode uplink control information (UCI) associated with the at least two downlink component carriers, wherein the UCI associated with the at least two downlink component carriers is jointly coded;
   map the jointly coded UCI associated with the at least two downlink component carriers to resource blocks that are used for reporting carrier aggregation based uplink control information; and
   the transceiver configured to transmit the mapped UCI on physical uplink control channel (PUCCH) carried by a single uplink component carrier of the at least one uplink component carrier.

14. The WTRU as in claim 13, wherein the UCI corresponds to at least hybrid automatic repeat request (HARQ) feedback for the at least two downlink component carriers.

15. The WTRU as in claim 13, wherein the at least one uplink component carrier is configured by a base station.

16. The WTRU as in claim 13, wherein the at least one uplink component carrier is signaled by at least one of radio resource controller signaling, higher layer signaling, or L1 signaling.

17. The WTRU as in claim 13, wherein the processor is configured to allocate different sets of resource blocks for different sequence lengths.

18. The WTRU as in claim 13, wherein different data symbols are spread with same or different cyclic shifts and mapped on same or different sets of resource blocks.

19. The WTRU as in claim 13, wherein a power-limited WTRU uses an adaptive transmission scheme that restricts the amount of UCI being transmitted.

20. The WTRU as in claim 13, wherein a power-limited WTRU uses an adaptive transmission scheme that uses more than one subframe to transmit the UCI.

21. The WTRU as in claim 13, wherein the carrier aggregation based resource blocks transmitted on the PUCCH are allocated to WTRUs for reporting carrier aggregation based control information.

22. The WTRU as in claim 21, wherein the UCI corresponds to hybrid automatic repeat request (HARQ) feedback for the at least two downlink component carriers.

* * * * *